(12) United States Patent
Shin et al.

(10) Patent No.: US 12,514,101 B2
(45) Date of Patent: Dec. 30, 2025

(54) ELECTRONIC DEVICE

(71) Applicant: Samsung Display Co., Ltd., Yongin-Si (KR)

(72) Inventors: Junyong Shin, Gunpo-si (KR); Seokgyu Yoon, Hwaseong-si (KR); Dongkyu Seo, Yongin-si (KR); Daeho Lee, Seoul (KR); Byungseok Lee, Suwon-si (KR); Jin-Soo Jung, Hwaseong-si (KR); Minsoo Choi, Hwaseong-si (KR); Youngeun Choi, Jeonju-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 644 days.

(21) Appl. No.: 17/880,871

(22) Filed: Aug. 4, 2022

(65) Prior Publication Data

US 2023/0140380 A1    May 4, 2023

(30) Foreign Application Priority Data

Oct. 28, 2021 (KR) ........................ 10-2021-0145084

(51) Int. Cl.
*H10K 65/00* (2023.01)
*G06F 3/042* (2006.01)
(Continued)

(52) U.S. Cl.
CPC ............. *H10K 65/00* (2023.02); *G06F 3/042* (2013.01); *G06V 40/1318* (2022.01); *H10K 59/38* (2023.02); *H10K 59/40* (2023.02)

(58) Field of Classification Search
None
See application file for complete search history.

(56) References Cited

U.S. PATENT DOCUMENTS 9,666,817 B2    5/2017  Kim et al.
10,388,706 B2   8/2019  Lee et al.
(Continued)

FOREIGN PATENT DOCUMENTS

JP       2020-053523 A2    4/2020
KR      10-2017-0014797    2/2017
(Continued)

*Primary Examiner* — Kyoung Lee
(74) *Attorney, Agent, or Firm* — F. CHAU & ASSOCIATES, LLC

(57) ABSTRACT

An electronic device including: a base layer; a display element layer disposed on the base layer and including a pixel defining layer that includes an opening, and a light emitting element and a light receiving element, which are separated by the pixel defining layer; and an input sensing layer disposed on the display element layer, wherein each of the light emitting element and the light receiving element includes: a first electrode; a hole transport region disposed on the first electrode; an electron transport region disposed on the hole transport region; and a second electrode disposed on the electron transport region, wherein the second electrode is a common layer in the light emitting element and the light receiving element, the light emitting element comprises a light emitting layer disposed between the hole transport region and the electron transport region, and the light receiving element comprises a light receiving layer which is provided between the first electrode and the second electrode and disposed in a layer different from the light emitting layer in a thickness direction of the electronic device.

20 Claims, 14 Drawing Sheets

(51) Int. Cl.
   *G06V 40/13*      (2022.01)
   *H10K 59/38*      (2023.01)
   *H10K 59/40*      (2023.01)

(56) References Cited

U.S. PATENT DOCUMENTS

| | | | |
|---|---|---|---|
| 10,978,523 | B2 | 4/2021 | Park et al. |
| 11,121,196 | B2 | 9/2021 | Lee |
| 2021/0233975 | A1 | 7/2021 | Bouthinon et al. |
| 2022/0285460 | A1* | 9/2022 | Kim ..................... H10K 59/60 |

FOREIGN PATENT DOCUMENTS

| | | |
|---|---|---|
| KR | 10-2018-0103206 | 9/2018 |
| KR | 10-2020-0040196 | 4/2020 |
| KR | 10-2020-0080484 A | 7/2020 |
| KR | 10-2020-0143898 A | 12/2020 |
| KR | 10-2021-0034552 | 3/2021 |

\* cited by examiner

ELECTRONIC DEVICE

CROSS-REFERENCE TO RELATED APPLICATION

This U.S. non-provisional patent application claims priority under 35 U.S.C. § 119 to Korean Patent Application No. 10-2021-0145084, filed on Oct. 28, 2021, the disclosure of which is incorporated by reference herein in its entirety.

TECHNICAL FIELD

The inventive concept described herein relates to an electronic device in which an active region includes a light receiving element.

DISCUSSION OF RELATED ART

Various types of electronic devices have been used to provide image information. For example, a smartphone or tablet computer may be used provide image information. Such an electronic device provides various functions that enable communication with a user by sensing an input from the user or the like. In particular, recent electric devices may include a fingerprint recognition method to sense a fingerprint of the user.

A fingerprint recognition method may include a capacitive method, an optical method or an ultrasonic method. The capacitive method may sense a variation in capacitance formed between electrodes, the optical method may sense incident light by using an optical sensor, and the ultrasonic method may sense a vibration by utilizing a piezoelectric body or the like. However, when a sensor in the optical method is included, it increases the area of a light receiving region.

SUMMARY

The inventive concept provides an electronic device that includes a light receiving element having a large area in a plan view.

An embodiment of the inventive concept provides an electronic device including: a base layer; a display element layer disposed on the base layer and including a pixel defining layer that includes an opening, and a light emitting element and a light receiving element, which are separated by the pixel defining layer; and an input sensing layer disposed on the display element layer, wherein each of the light emitting element and the light receiving element includes: a first electrode; a hole transport region disposed on the first electrode; an electron transport region disposed on the hole transport region; and a second electrode disposed on the electron transport region, wherein the second electrode is a common layer in the light emitting element and the light receiving element, the light emitting element comprises a light emitting layer disposed between the hole transport region and the electron transport region, and the light receiving element includes a light receiving layer which is provided between the first electrode and the second electrode and disposed in a layer different from the light emitting layer in a thickness direction of the electronic device.

An area of the light receiving layer is greater than an area of the light emitting layer in a plan view.

The light receiving layer does not overlap the light emitting layer in a plan view.

The light receiving layer is disposed between the electron transport region and the second electrode.

The electron transport region includes an electron transport layer and an electron injection layer disposed between the electron transport layer and the second electrode, and the light receiving layer is disposed between the electron transport layer and the electron injection layer or between the electron injection layer and the second electrode.

The electron transport region includes a hole blocking layer, an electron transport layer disposed between the hole blocking layer and the second electrode, and an electron injection layer disposed between the electron transport layer and the second electrode, and the light receiving layer is disposed between the hole blocking layer and the electron transport layer, between the electron transport layer and the electron injection layer or between the electron injection layer and the second electrode.

The light receiving layer is disposed between the hole transport region and the first electrode.

The hole transport region includes a hole transport layer and a hole injection layer disposed between the hole transport layer and the first electrode, and the light receiving layer is disposed between the first electrode and the hole injection layer or between the hole injection layer and the hole transport layer.

The hole transport region includes an electron blocking layer, a hole transport layer disposed between the electron blocking layer and the first electrode, and a hole injection layer disposed between the hole transport layer and the first electrode, and the light receiving layer is disposed between the first electrode and the hole injection layer, between the hole injection layer and the hole transport layer, or between the hole transport layer and the electron blocking layer.

An embodiment of the inventive concept provides an electronic device including: a base layer; a first electrode disposed on the base layer and including a light emitting electrode and a light receiving electrode which are spaced apart from each other; a pixel defining layer which is disposed on the base layer, wherein the pixel defining layer includes a first opening to expose the light emitting electrode and a second opening to expose the light receiving electrode; a second electrode disposed on the first electrode; a hole transport region disposed between the first electrode and the second electrode; an electron transport region disposed between the hole transport region and the second electrode; a light emitting layer which overlaps the light emitting electrode and is disposed between the hole transport region and the electron transport region; and a light receiving layer which is provided between the light receiving electrode and the second electrode and disposed in a layer different from the light emitting layer.

An area of the second opening is greater than an area of the first opening in a plan view.

An area of the light receiving layer is greater than an area of the light emitting layer in the plan view.

The light receiving layer is disposed between the light receiving electrode and the hole transport region or between the electron transport region and the second electrode.

The hole transport region includes a hole transport layer and a hole injection layer disposed between the hole transport layer and the first electrode, and the electron transport region includes an electron transport layer and an electron injection layer disposed between the electron transport layer and the second electrode, wherein the light receiving layer is disposed between the light receiving electrode and the hole injection layer, between the hole injection layer and the hole transport layer, between the electron transport layer and the electron injection layer, or between the electron injection layer and the second electrode.

The hole transport region comprises an electron blocking layer, a hole transport layer disposed between the electron blocking layer and the light receiving electrode, and a hole injection layer disposed between the hole transport layer and the light receiving electrode, and the electron transport region includes a hole blocking layer, an electron transport layer disposed between the hole blocking layer and the second electrode, and an electron injection layer disposed between the electron transport layer and the second electrode, wherein the light receiving layer is disposed between the light receiving electrode and the hole injection layer, between the hole injection layer and the hole transport layer, between the hole transport layer and the electron blocking layer, between the hole blocking layer and the electron transport layer, between the electron transport layer and the electron injection layer, or between the electron injection layer and the second electrode.

An embodiment of the inventive concept provides an electronic device including a first light emitting region, a second light emitting region, a third light emitting region, and a light receiving region which are spaced apart from each other in a plan view, the electronic device including: a base layer; a display element layer including a pixel defining layer, which is disposed on the base layer and has an opening, and first, second and third light emitting elements and a light receiving element, which are separated by the pixel defining layer; and an input sensing layer disposed on the display element layer, wherein each of the first, second and third light emitting elements and the light receiving element includes: a first electrode; a hole transport region disposed on the first electrode; an electron transport region disposed on the hole transport region; and a second electrode disposed on the electron transport region, wherein the first, second and third light emitting elements include first, second and third light emitting layers, respectively, which are disposed between the hole transport region and the electron transport region, and the light receiving element includes a light receiving layer which is provided between the first electrode and the second electrode and disposed in a layer different from the first, second and third light emitting layers.

An area of the light receiving region is greater than an area of each of the first, second and third light emitting regions in a plan view.

The first, second and third light emitting layers are disposed in the same layer.

The first light emitting layer emits red light, the second light emitting layer emits green light, and the third light emitting layer emits blue light.

Each of the hole transport region and the electron transport region overlaps the pixel defining layer, the first, second and third light emitting layers, and the light receiving layer.

BRIEF DESCRIPTION OF THE FIGURES

The accompanying drawings illustrate embodiments of the inventive concept and, together with the description, serve to explain principles of the inventive concept. In the drawings.

DETAILED DESCRIPTION OF THE EMBODIMENTS

Figure 1:
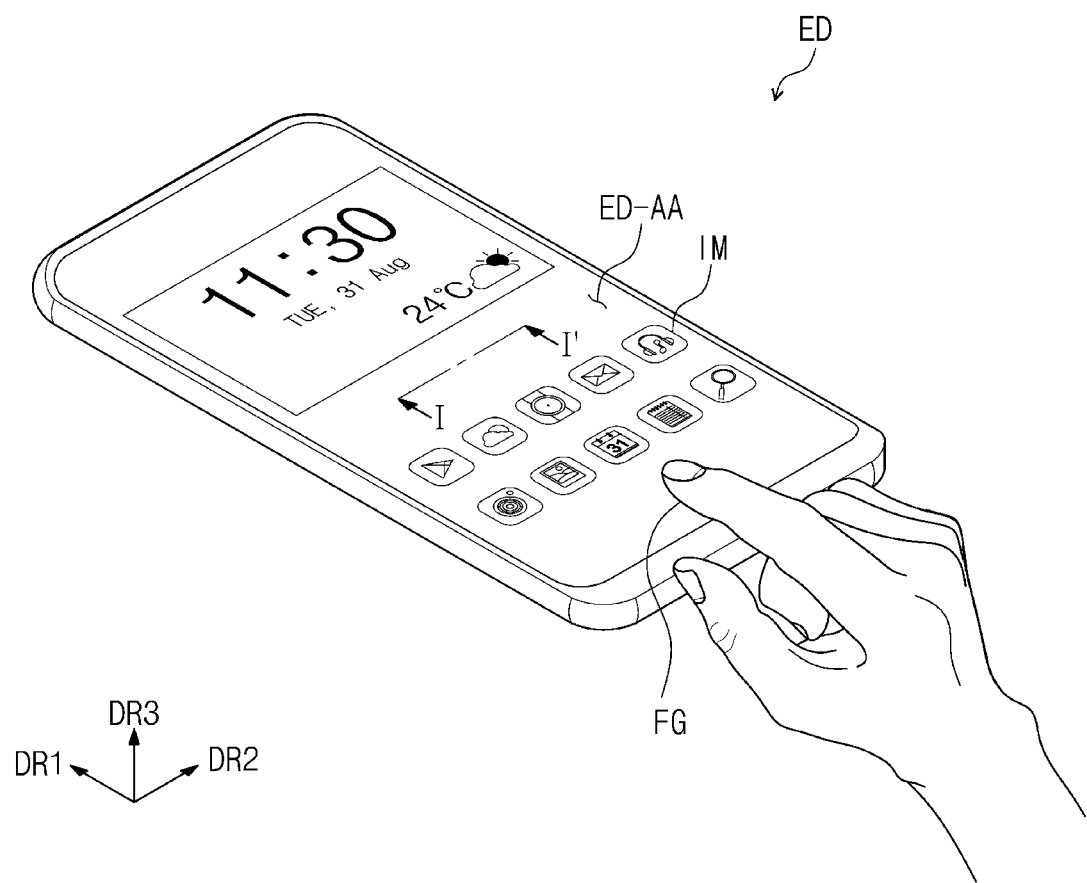
FIG. 1 is a perspective view of an electronic device in an embodiment of the inventive concept.

Since the inventive concept may have various modifications and be embodied in different forms, example embodiments are illustrated in the drawings and described in detail in the description. However, this is not intended to limit the inventive concept to the embodiments set forth herein, and it should be understood that various changes and modifications within the scope of inventive concept may be made by one of ordinary skill in the art.

In the specification, it will be understood that when an element (or a region, a layer, a portion, or the like) is referred to as being "on", "connected to" or "coupled to" another element, it can be directly disposed on, connected or coupled to another element, or intervening elements may be disposed therebetween.

Being "disposed directly on" may mean that there is no additional layer, film, region, plate, or the like between a part and another part such as a layer, a film, a region, or a plate. For example, being "disposed directly on" may mean that two layers or two members are disposed without using an additional member such as an adhesive member therebetween.

Like numbers may refer to like elements throughout. In addition, in the drawings, the thicknesses, ratios, and dimensions of the elements may be exaggerated for effective description of the technical contents.

The term "and/or" includes all of one or more combinations which can be defined by related components.

Although the terms first, second, etc. may be used herein to describe various elements, these elements should not be limited by these terms. These terms are merely used to distinguish one element from another element. For example, a first element may be referred to as a second element, and similarly, a second element may also be referred to as a first element. The singular forms include the plural forms as well, unless the context clearly indicates otherwise.

In addition, terms such as "below", "lower", "above", and "upper" may be used to describe the relationships of the components illustrated in the drawings. These terms have relative concepts and are described on the basis of the directions indicated in the drawings. In the specification, being "disposed on" may represent not only being disposed on the top surface but also being disposed on the bottom surface.

Unless otherwise defined, all terms (including technical and scientific terms) used herein have the same meaning as commonly understood by one of ordinary skill in the art to which the inventive concept belongs. In addition, terms, such as those defined in commonly used dictionaries, should be interpreted as having a meaning that is consistent with their meaning in the context of the relevant art and should not be interpreted in an idealized or overly formal sense unless expressly so defined herein.

It will be understood that the term "includes" or "comprises", when used in this specification, specifies the presence of stated features, numbers, steps, operations, elements, components, or a combination thereof, but does not preclude the presence or addition of one or more other features, numbers, steps, operations, elements, components, or combinations thereof.

Hereinafter, an electronic device according to an embodiment of the inventive concept will be described with reference to the drawings.

Figure 2:
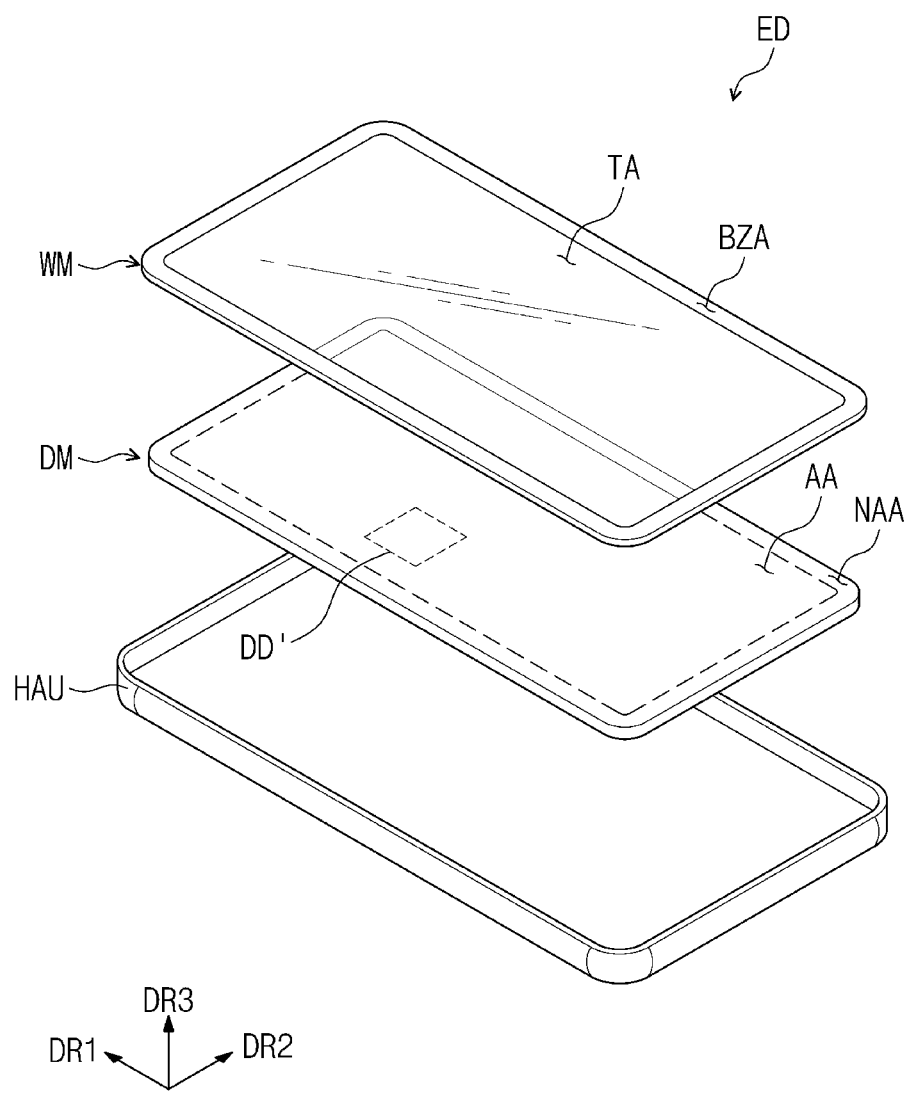
FIG. 2 is an exploded perspective view of an electronic device in an embodiment of the inventive concept.
Figure 3:
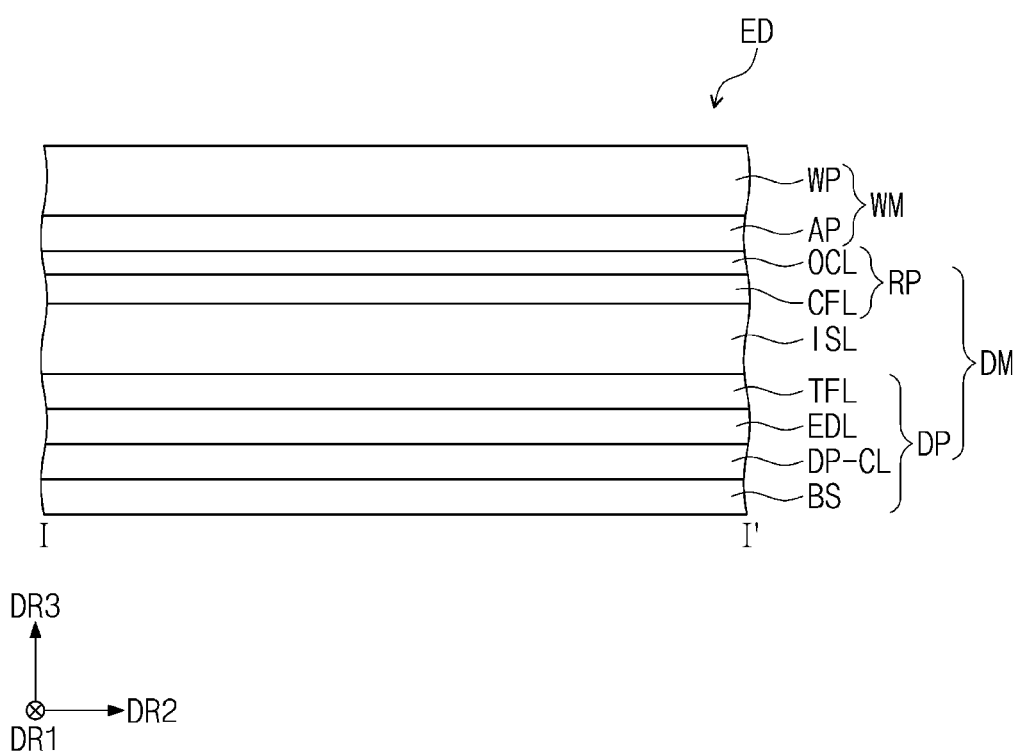
FIG. 3 is a cross-sectional view of an electronic device in an embodiment of the inventive concept.

FIG. 1 is a perspective view showing an electronic device according to an embodiment of the inventive concept. FIG. 2 is an exploded perspective view showing an electronic device according to an embodiment of the inventive concept. FIG. 3 is a cross-sectional view schematically showing a section taken along line I-I' of FIG. 1.

An electronic device ED of an embodiment illustrated in FIGS. 1 to 3 may be a device activated in response to an electrical signal. For example, the electronic device ED may be a mobile phone, a tablet personal computer (PC), a vehicle navigation unit, a game console, or a wearable device, but the inventive concept is not limited thereto. As an example, FIG. 1 illustrates the electronic device ED as a mobile phone.

The electronic device ED may display an image IM through an active region ED-AA. The active region ED-AA may include a plane formed by a first direction axis DR1 and a second direction axis DR2. The active region ED-AA may further include a curved surface that bends from at least one side of the plane formed by the first direction axis DR1 and the second direction axis DR2. For example, the active region ED-AA may include only the plane, and the active region ED-AA may further include four curved surfaces that bend respectively from at least two or more, for example, four sides of the plane.

FIG. 1 illustrates the first direction axis DR1 to a third direction axis DR3, and FIG. 4 further illustrates a fourth direction axis DR4 which will be described later. The directions indicated as the first to fourth direction axes DR1, DR2, DR3, and DR4 described in this specification are relative, and thus, may be changed to other directions. The directions indicated as the first to fourth direction axes DR1, DR2, DR3, and DR4 may be described as first to fourth directions, and the same reference symbols may be used. For example, DR1 may be referred to as the first direction.

In this specification, the first direction axis DR1 may be perpendicular to the second direction axis DR2, and the third direction axis DR3 may be a normal direction of the plane formed by the first direction axis DR1 and the second direction axis DR2. The fourth direction DR4 may have a direction between the direction of the first direction axis DR1 and the direction of the second direction axis DR2.

Referring to FIG. 1, the thickness direction of the electronic device ED may be parallel to the third direction axis DR3 that is a normal direction of the plane formed by the first direction axis DR1 and the second direction axis DR2. In this specification, a front surface (or a top surface) and a rear surface (or a bottom surface) of members constituting the electronic device ED may be described with respect to the third direction axis DR3.

The image IM provided from the electronic device ED may include static images as well as dynamic images. In FIG. 1, a watch window and icons are illustrated as one example of the image IM. A surface, on which the image IM is displayed, may correspond to the front surface of the electronic device ED and may correspond to the front surface of a window member WM.

In addition, the electronic device ED may sense an input of a user applied from the outside. For example, the input of a user includes various types of external inputs such as a portion of the user's body, light, heat, or pressure. The electronic device ED may sense the user's input through the active region ED-AA, and may respond to the sensed input signal. In addition, the electronic device ED may also sense a user's input applied to a side surface or a bottom surface thereof depending on the design of the electronic device ED.

For example, the electronic device ED may sense biological information such as a fingerprint FG of a user applied from the outside. A fingerprint recognition region may be provided in the active region ED-AA of the electronic device ED. The fingerprint recognition region may be provided in the entire active region ED-AA or may be provided in a portion of the active region ED-AA.

Referring to FIGS. 2 and 3, the electronic device ED may include a display module DM, a window member WM, and a housing HAU. In an embodiment of the inventive concept, the window member WM and the housing HAU may be coupled to each other to form an exterior of the electronic device ED.

In the electronic device ED, the display module DM may include a display element layer EDL, a color filter layer CFL, and an organic planarization layer OCL. In the electronic device ED, the organic planarization layer OCL disposed above the color filter layer CFL may include an infrared light-absorbing agent.

The display module DM may be divided into an active region AA and a peripheral region NAA. The active region AA may be a region to be activated in response to an electrical signal. As described above, the active region AA may be a portion of the display module DM for displaying an image or sensing an external input.

The peripheral region NAA may be a region positioned adjacent to at least one side of the active region AA. The peripheral region NAA may surround the active region AA. However, the inventive concept is not limited thereto. In an embodiment, a portion of the peripheral region NAA may be removed unlike that illustrated in FIG. 2. A driving circuit, a driving line, or the like for driving the active region AA may be disposed in the peripheral region NAA.

The display module DM may include a display panel DP and an anti-reflection member RP. In addition, the display module DM may include an input sensing layer ISL disposed between the display panel DP and the anti-reflection member RP.

The display panel DP may include a base layer BS and a display element layer EDL disposed on the base layer BS. In addition, the display panel DP may include the base layer BS, a circuit layer DP-CL disposed on the base layer BS, a display element layer EDL disposed on the circuit layer DP-CL, and an encapsulation layer TFL disposed on the display element layer EDL. The encapsulation layer TFL may cover the display element layer EDL.

The electronic device ED may further include a window member WM disposed on the display module DM. The window member WM may include a window WP and an adhesive layer AP, and the adhesive layer AP may be disposed between the anti-reflection member RP and the window WP. The adhesive layer AP may be an optically clear adhesive film OCA or an optically clear adhesive resin layer OCR. In an embodiment, the adhesive layer AP may be omitted.

The window WP may cover the entire outer side of the display module DM. The window WP may have a shape that conforms to the shape of the display module DM. In the electronic device ED, the window WP may include an optically transparent insulating material. The window WP may be a glass substrate or a polymer substrate. For example, the window WP may be a tempered glass substrate in which a strengthening treatment is performed. The window WP may serve as the uppermost layer of the electronic device ED.

In addition, the window member WM in the electronic device ED may be divided into a transmission portion TA and a bezel portion BZA. The transmission portion TA may be a portion corresponding to the active region AA of the display module DM, and the bezel portion BZA may be a portion corresponding to the peripheral region NAA of the display module DM.

The front surface of the window member WM including the transmission portion TA and the bezel portion BZA may serve as the front surface of the electronic device ED. A user may see an image which is provided through the transmission portion TA serving as the front surface of the electronic device ED.

The bezel portion BZA may form the shape of the transmission portion TA. The bezel portion BZA may be adjacent to the transmission portion TA and surround the transmission portion TA. However, the inventive concept is not limited to that illustrated in FIG. 2. The bezel portion BZA may be disposed adjacent only to one side of the transmission portion TA, or may be partially removed.

In the electronic device ED, a portion of the electronic device ED, which is seen through the bezel portion BZA, may have a light transmittance relatively lower than that of a portion, which is seen through the transmission portion TA. In addition, in the electronic device ED, the bezel portion BZA may be a portion which is seen as having a predetermined color.

In the electronic device ED, the anti-reflection member RP may include the color filter layer CFL and the organic planarization layer OCL. For example, the anti-reflection member RP may reduce reflectivity of external light incident from the outside, or may absorb and block a portion of the light incident from the outside.

The input sensing layer ISL included in the electronic device ED may be disposed on the display panel DP. The input sensing layer ISL may sense an external input applied from the outside. The external input may be an input of a user. The input of the user may include various types of external inputs such as a portion of the user's body, light, heat, a pen, or pressure.

Figure 4:
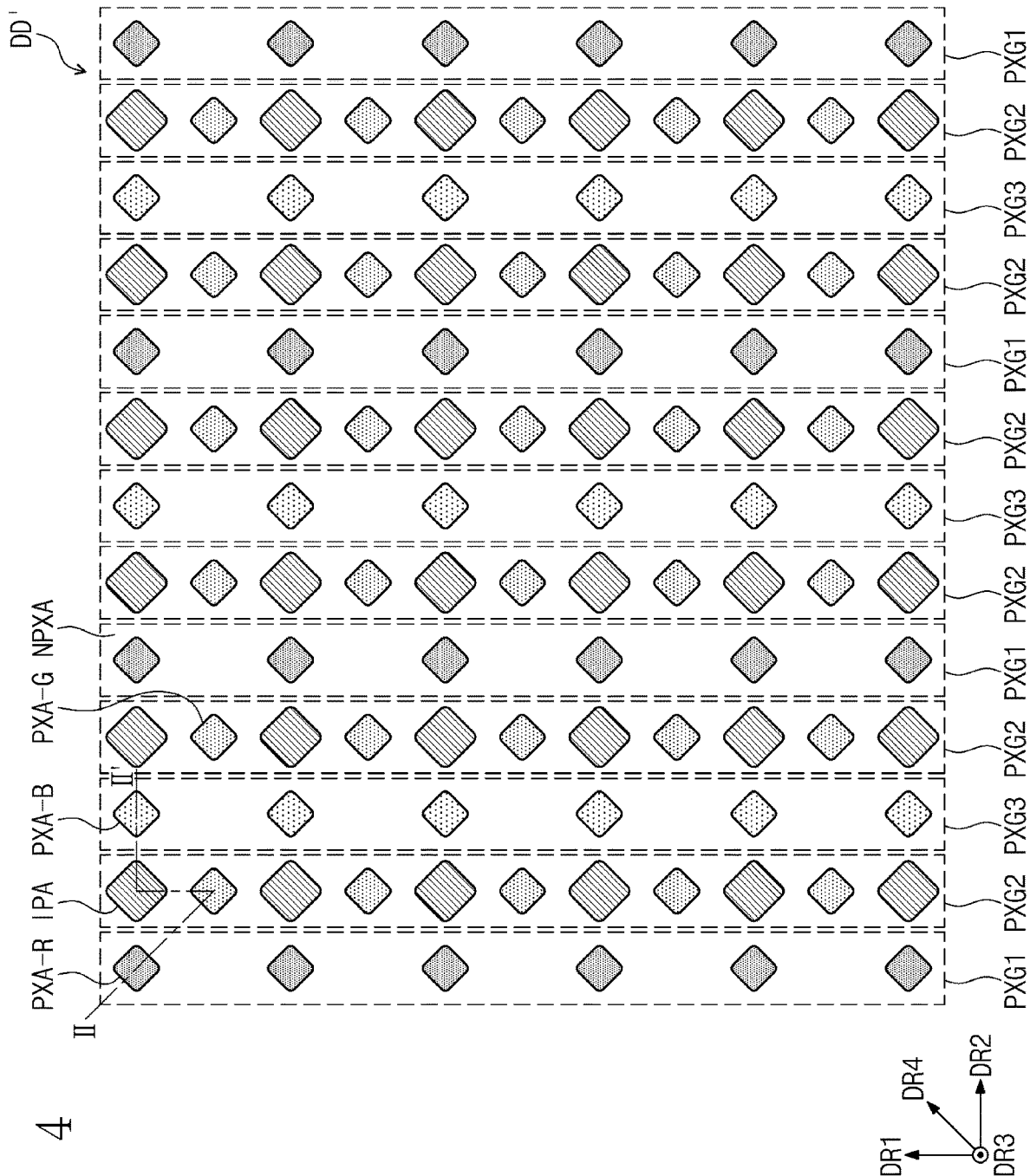
FIG. 4 is a plan view of a portion of a display module according to an embodiment of the inventive concept.

FIG. 4 is a plan view showing a portion of a display module according to an embodiment of the inventive concept. FIG. 4 is a plan view showing a region DD' of FIG. 2. Referring to FIG. 4, the display module DM may include a plurality of light emitting regions PXA-R, PXA-G, and PXA-B and a light receiving region IPA which are disposed within the active region AA. The display module DM may include a red light emitting region PXA-R for emitting red light, a green light emitting region PXA-G for emitting green light, and a blue light emitting region PXA-B for emitting blue light. In addition, the light receiving region IPA may be included, which receives and senses light incident after reflecting from an external object. A non-light emitting region NPXA may be disposed between the light emitting regions PXA-R, PXA-G, and PXA-B and between the light emitting regions PXA-R, PXA-G, and PXA-B and the light receiving region IPA. The light emitting regions PXA-R, PXA-G, and PXA-B may be divided by the non-light emitting region NPXA. In addition, the light emitting regions PXA-R, PXA-G, and PXA-B and the light receiving region IPA may be divided by the light receiving region IPA. The non-light emitting region NPXA may surround each of the light emitting regions PXA-R, PXA-G, and PXA-B and the light receiving region IPA.

In an embodiment of the inventive concept, among the plurality of light emitting regions PXA-R, PXA-G, and PXA-B, the light emitting regions that emit light having different ranges of wavelengths may have different areas. Here, each of the areas may represent an area when viewed in a plane formed by the first direction axis DR1 and the second direction axis DR2.

However, the inventive concept is not limited thereto. The light emitting regions PXA-R, PXA-G, and PXA-B may have the same area, or the light emitting regions PXA-R, PXA-G, and PXA-B having area ratios different from that illustrated in FIG. 4 may be provided. In addition, the light emitting regions PXA-R, PXA-G, and PXA-B may emit light having colors other than red light, green light, and blue light, or may have planar shapes different from those illustrated in FIG. 4.

In an embodiment of the inventive concept, the area of the light receiving region IPA may be greater than the area of each of the red light emitting region PXA-R, the blue light emitting region PXA-B, and the green light emitting region PXA-G in a plan view.

Referring to FIG. 4, red light emitting regions PXA-R may be arranged spaced apart from each other along the first direction axis DR1 and constitute a first group PXG1. Green light emitting regions PXA-G and light receiving regions IPA may be alternately arranged along the first direction axis DR1 and constitute a second group PXG2. In addition, blue light emitting regions PXA-B may be arranged spaced apart from each other along the first direction axis DR1 and constitute a third group PXG3.

The first group PXG1 to the third group PXG3 may be disposed and arranged in this order in the direction of the second direction axis DR2. Each of the first group PXG1 to the third group PXG3 may be provided in plural. In the embodiment illustrated in FIG. 4, the first group PXG1, the second group PXG2, the third group PXG3, and the second group PXG2 along the second direction axis DR2 form one repeating unit, and these repeating units may be repeatedly arranged in the direction of the second direction axis DR2.

In an embodiment of the inventive concept, one green light emitting region PXA-G may be spaced apart from one red light emitting region PXA-R or one blue light emitting region PXA-B in the direction of the fourth direction axis DR4. The fourth direction DR4 may be a direction between the direction of the first direction axis DR1 and the direction of the second direction axis DR2.

In addition, in an embodiment of the inventive concept, the light receiving region IPA may be spaced apart from each of the light emitting regions PXA-R, PXA-G, and PXA-B, and may be disposed between the red light emitting region PXA-R and the blue light emitting region PXA-B and spaced apart from each other in the direction of the second direction axis DR2. The light receiving regions IPA and the green light emitting regions PXA-G may be alternately arranged one by one along the first direction axis DR1.

The arrangement structure of the light emitting regions PXA-R, PXA-G, and PXA-B illustrated in FIG. 4 may be referred to as Pentile® structure. However, the arrangement structure of the light emitting regions PXA-R, PXA-G, and PXA-B in the electronic device ED is not limited to the arrangement structure illustrated in FIG. 4. For example, in an embodiment of the inventive concept, the light emitting regions PXA-R, PXA-G, and PXA-B may also have a stripe structure in which the red light emitting regions PXA-R, the green light emitting regions PXA-G, and the blue light emitting regions PXA-B are alternately arranged in this order along the first direction axis DR1 or the second direction axis DR2. In addition, in the stripe arrangement structure, the light receiving regions IPA may form the same row or the same column as the green light emitting regions PXA-G and construct one stripe arrangement. However, in an embodiment of the inventive concept, the arrangement configuration of the light receiving regions IPA and the light emitting regions PXA-R, PXA-G, and PXA-B and the arrangement ratio of the light receiving regions IPA and the light emitting regions PXA-R, PXA-G, and PXA-B may be different from the arrangement configurations described above.

Figure 5A:
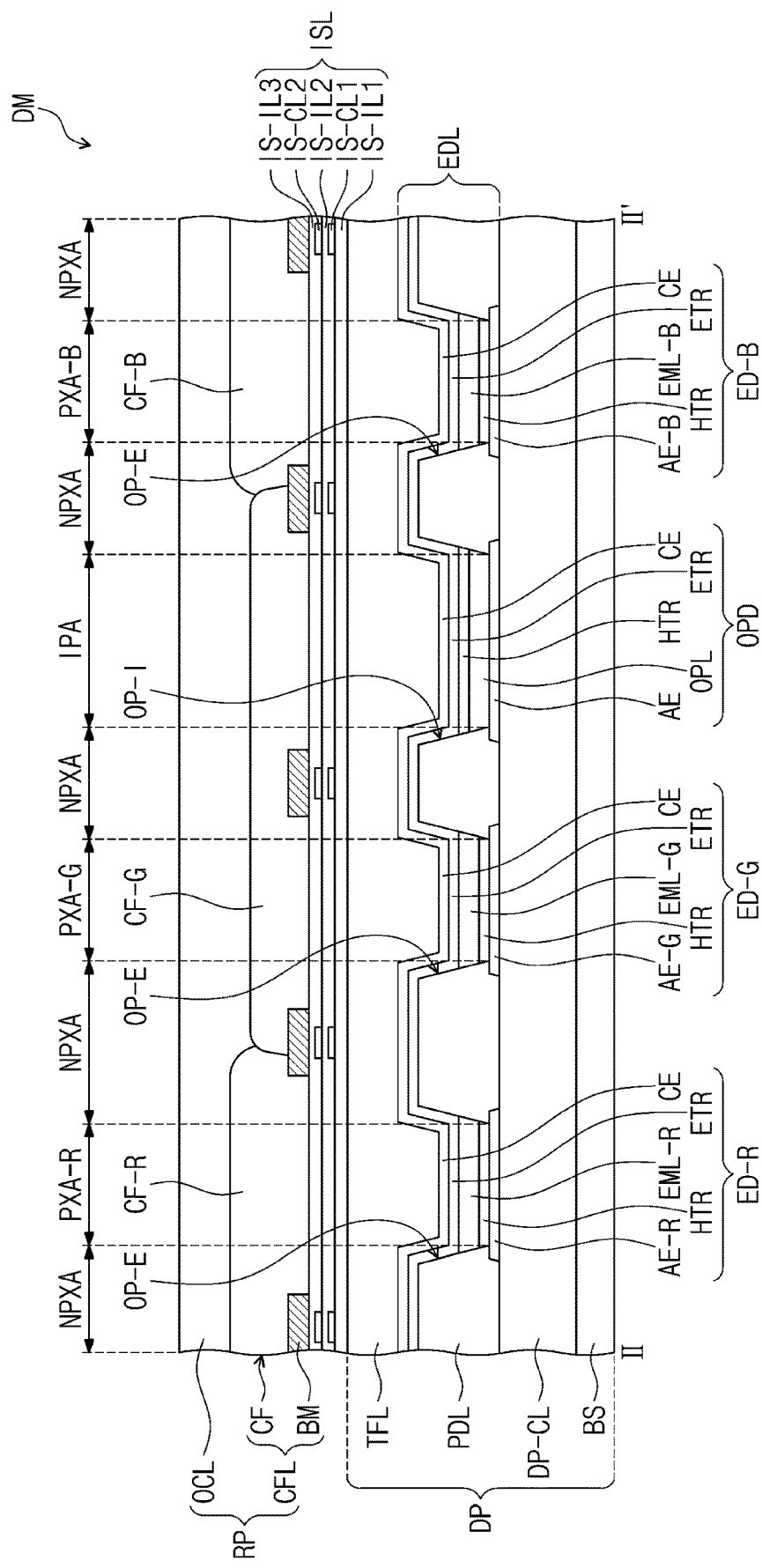
FIG. 5A is a cross-sectional view showing a portion of a display module according to an embodiment of the inventive concept.
Figure 5B:
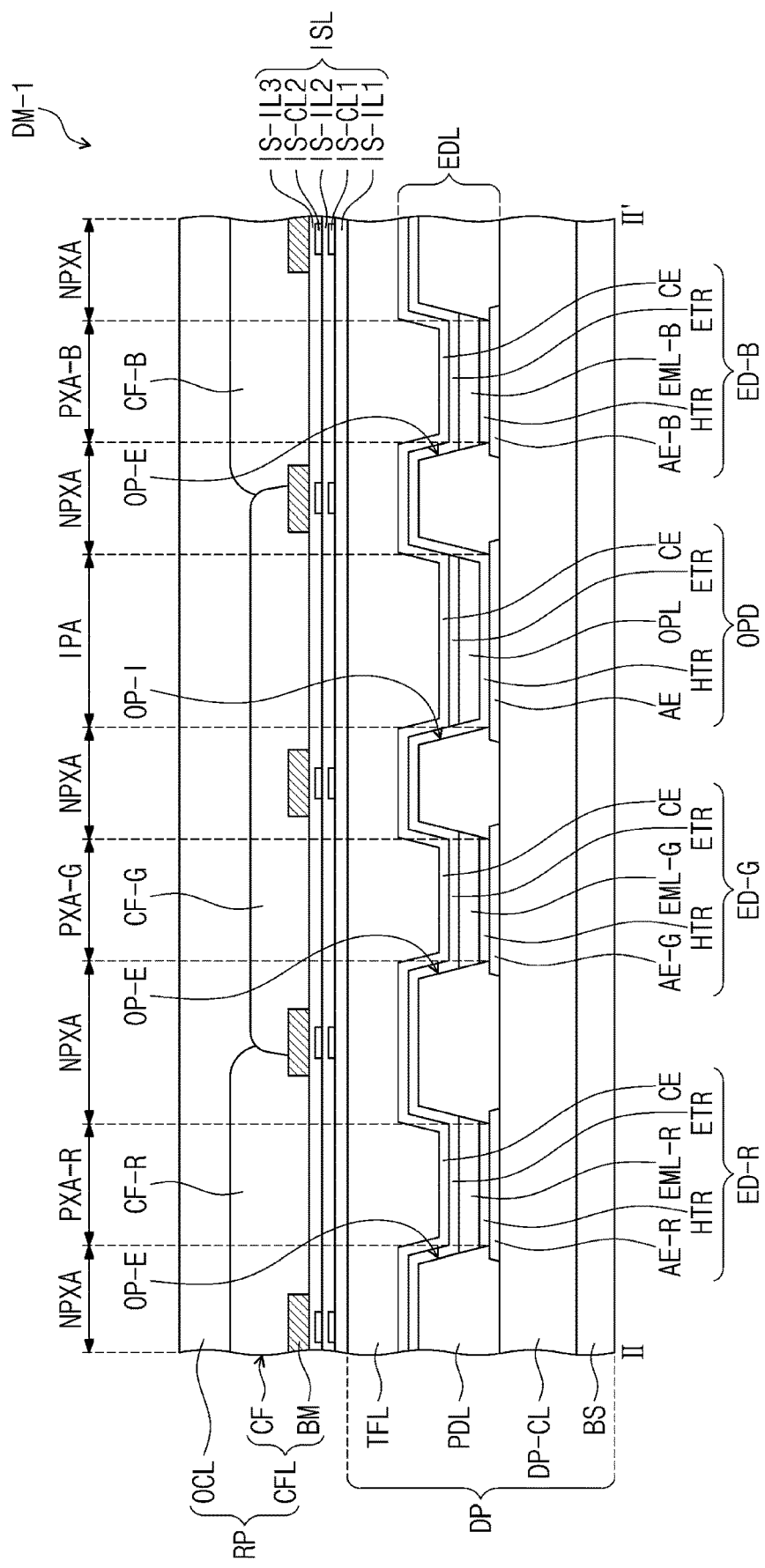
FIG. 5B is a cross-sectional view showing a portion of a display module according to an embodiment of the inventive concept.
Figure 6A:
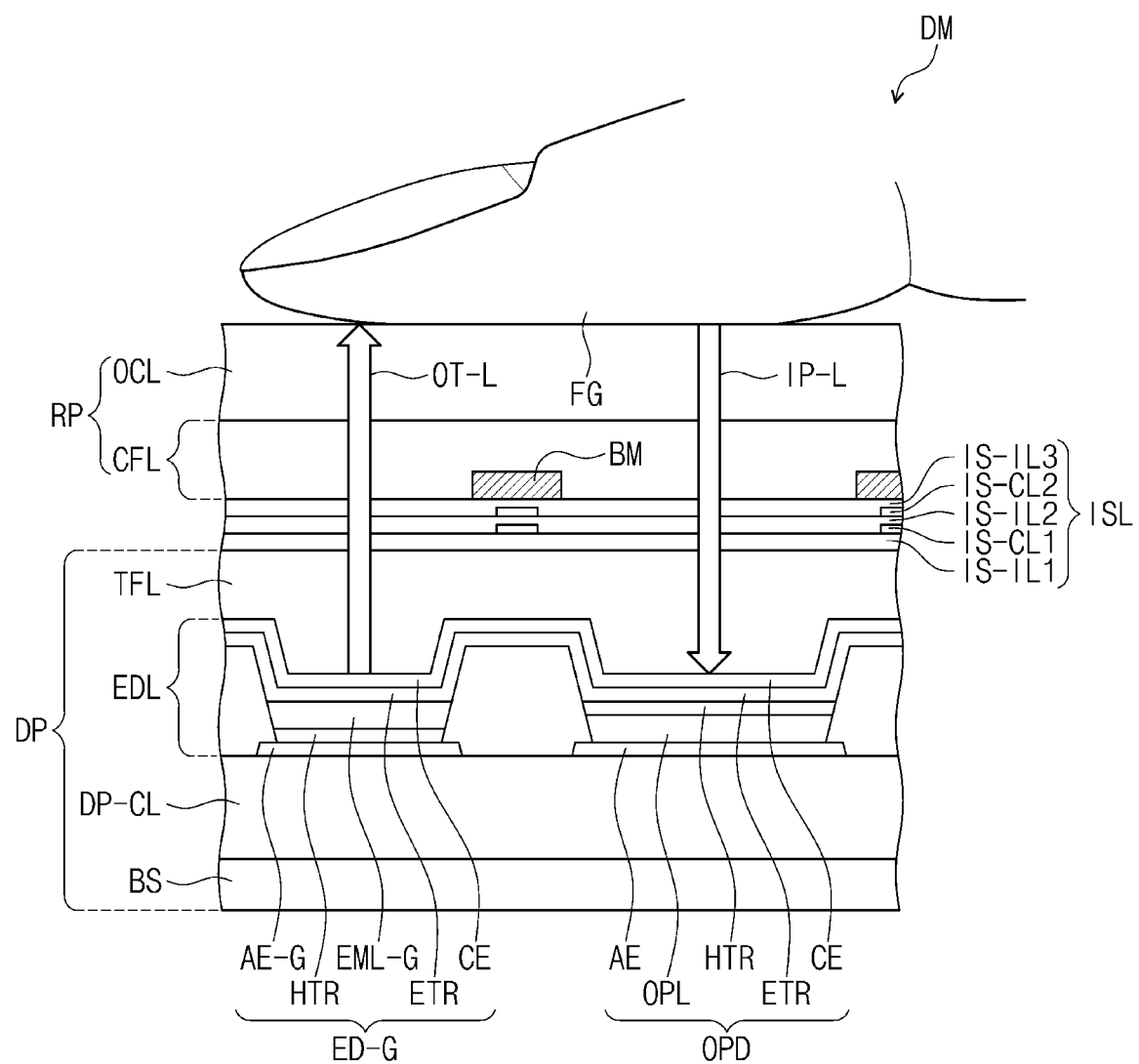
FIG. 6A is a cross-sectional view showing a portion of a display module according to an embodiment of the inventive concept.
Figure 6B:
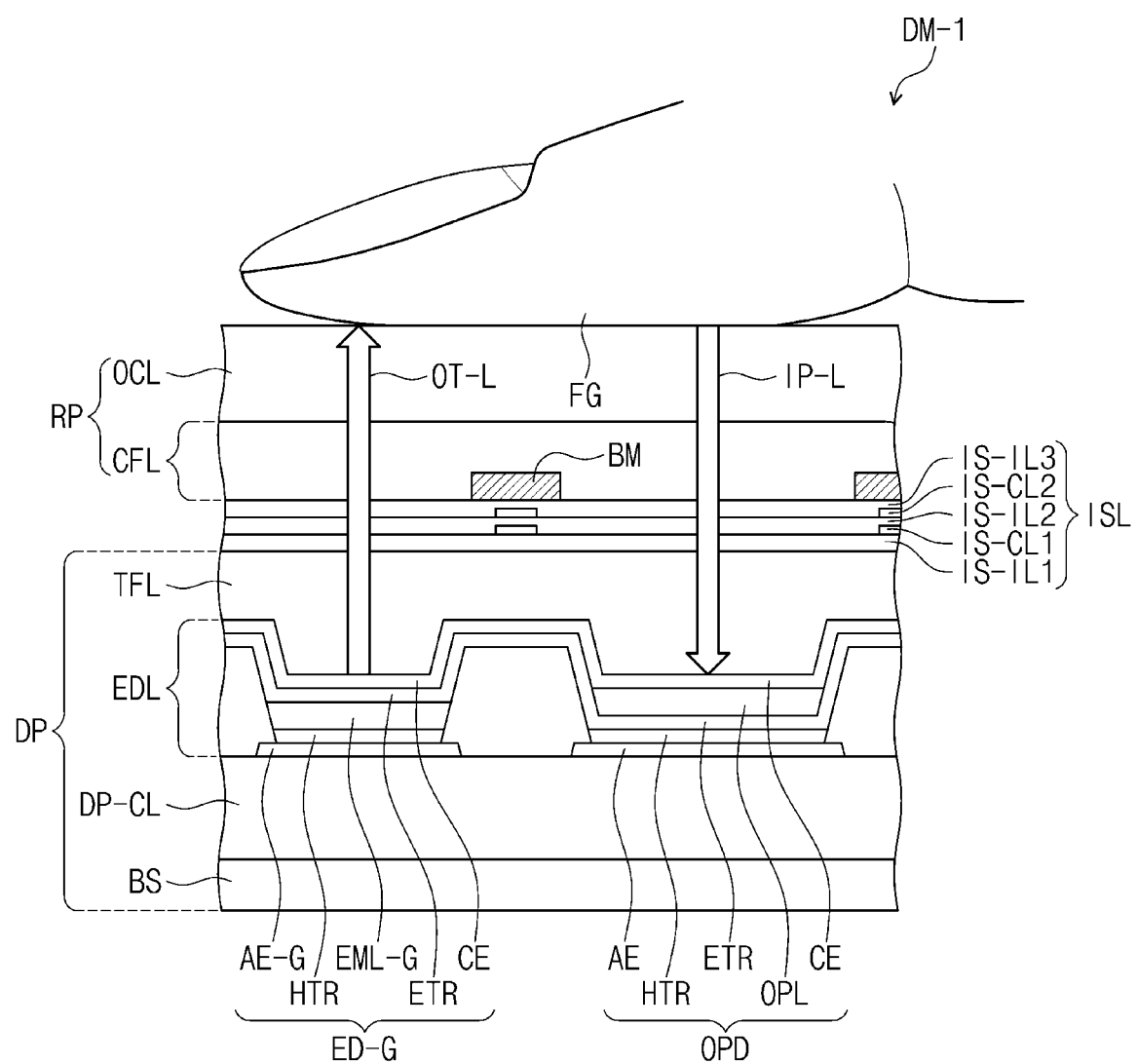
FIG. 6B is a cross-sectional view showing a portion of a display module according to an embodiment of the inventive concept.

Each of FIGS. 5A and 5B is a cross-sectional view showing a portion of a display module according to an embodiment of the inventive concept. Each of FIGS. 6A and 6B is a cross-sectional view showing a display module according to an embodiment of the inventive concept. Each of FIGS. 5A and 5B is a cross-sectional view showing a portion corresponding to line II-II' of FIG. 4. Each of FIGS. 6A and 6B illustrates a state in which each of display modules DM and DM-1 recognizes a fingerprint FG that is an external input.

Referring to FIGS. 5A to 6B, each of the display modules DM and DM-1 includes a base layer BS and a display element layer EDL. Each of the display modules DM and DM-1 may further include a circuit layer DP-CL, an encapsulation layer TFL, and an anti-reflection member RP.

The base layer BS may be a member that provides a base surface on which the display element layer EDL is disposed. The base layer BS may be a glass substrate, a metal substrate, a polymer substrate, or the like. However, the inventive concept is not limited thereto, and the base layer BS may be an inorganic layer, an organic layer, or a composite material layer.

The base layer BS may have a multilayer structure. For example, the base layer BS may have a three layer structure of a synthetic resin layer, an adhesive layer, and a synthetic resin layer. In particular, the synthetic resin layer may include polyimide-based resin. In addition, the synthetic resin layer may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, or a perylene-based resin. In this specification, a "-based" resin may be considered as including a "-" functional group.

The circuit layer DP-CL may be disposed on the base layer BS. The circuit layer DP-CL may include an insulating layer, a semiconductor pattern, a conductive pattern, a signal line, and the like. The insulating layer, the semiconductor layer, and the conductive layer are formed on the base layer BS through a coating or deposition method, and subsequently, the insulating layer, the semiconductor layer, and the conductive layer may be selectively patterned through photolithography processes performed multiple times. Then, the semiconductor pattern, the conductive pattern, and the signal line included in the circuit layer DP-CL may be formed.

The display element layer EDL may be disposed on the circuit layer DP-CL. The display element layer EDL may include light emitting elements ED-R, ED-G, and ED-B and a light receiving element OPD. For example, the light emitting elements ED-R, ED-G, and ED-B included in the display element layer EDL may include an organic light emitting element, a quantum dot light emitting element, a micro light emitting diode (LED) light emitting element, or a nano LED light emitting element. However, the inventive concept is not limited thereto. The light emitting elements ED-R, ED-G, and ED-B may have various configurations as long as light is generated in response to an electrical signal or an amount of the light is controllable.

The light receiving element OPD may be an optical sensor that receives and recognizes the light reflected by an external object. For example, the light receiving element OPD may be an optical sensor that recognizes the light of the visible light range reflected by an external object. In an embodiment of the inventive concept, the light receiving element OPD may be a biometric sensor which recognizes light reflected from parts of a user's body such as the fingerprint and vein and converts an optical signal into an electrical signal.

The display element layer EDL includes a pixel defining layer PDL in which openings OP-E and OP-I are defined, and the light emitting elements ED-R, ED-G, and ED-B and the light receiving element OPD may be separated from each other and divided with respect to the pixel defining layer PDL. First openings OP-E, in which components of the light emitting elements ED-R, ED-G, and ED-B are disposed, and a second opening OP-I, in which components of the light receiving element OPD are disposed, may be provided in the pixel defining layer PDL.

The pixel defining layer PDL may be disposed on the base layer BS. The pixel defining layer PDL may be disposed on the circuit layer DP-CL, and may expose portions of the top surfaces of first electrodes AE-R, AE-G, AE-B, and AE through the openings OP-E and OP-I. In the present embodiment, the light emitting regions PXA-R, PXA-G, and PXA-B and the light receiving region IPA correspond to regions of the first electrodes AE-R, AE-G, AE-B, and AE exposed through the openings OP-E and OP-I.

In an embodiment of the inventive concept, the pixel defining layer PDL may be made of a polymer resin. For example, the pixel defining layer PDL may include a polyacrylate-based resin or a polyimide-based resin. In addition, the pixel defining layer PDL may further include an inorganic material in addition to the polymer resin. The pixel defining layer PDL may include a light absorbing material or may include black pigment or black dye. The pixel defining layer PDL including the black pigment or black dye may achieve a black pixel defining layer. Carbon black or the like may be used as the black pigment or black dye when the pixel defining layer PDL is formed, but the inventive concept is not limited thereto.

In addition, the pixel defining layer PDL may be made of an organic material. For example, the pixel defining layer PDL may include silicon nitride ($SiN_x$), silicon oxide ($SiO_x$), silicon oxynitride ($SiO_xN_y$), or the like.

Each of the light emitting elements ED-R, ED-G, and ED-B may include the first electrodes AE-R, AE-G, and AE-B, a second electrode CE, a hole transport region HTR, an electron transport region ETR, and light emitting layers EML-R, EML-G, and EML-B. The first electrodes AE-R, AE-G, and AE-B may be exposed through the first openings OP-E. The first electrodes AE-R, AE-G, and AE-B constituting the light emitting elements ED-R, ED-G, and ED-B may be referred to as light emitting electrodes.

The light receiving element OPD may include a first electrode AE, a second electrode CE, a hole transport region HTR, an electron transport region ETR, and a light receiving layer OPL. The first electrode AE may be exposed through the second opening OP-I. The first electrode AE constituting the light receiving element OPD may be referred to as a light receiving electrode.

In an embodiment of the inventive concept, the display element layer EDL may include a red light emitting element ED-R that is disposed corresponding to the red light emitting region PXA-R and emits red light, a green light emitting element ED-G that is disposed corresponding to the green light emitting regions PXA-G and emits green light, and a blue light emitting element ED-B that is disposed corresponding to the blue light emitting regions PXA-B and emits blue light. In other words, the red light emitting element ED-R is provided in the red light emitting region PXA-R, the green light emitting element ED-G is provided in the green light emitting regions PXA-G and the blue light emitting element ED-B is provided in the blue light emitting regions PXA-B. The red light emitting element ED-R may include a first electrode AE-R and a second electrode CE, which face each other, and a red light emitting layer EML-R, which is disposed between the first electrode AE-R and the second electrode CE. The green light emitting element ED-G may include a first electrode AE-G and a second electrode CE, which face each other, and a green light emitting layer EML-G, which is disposed between the first electrode AE-G and the second electrode CE. The blue light emitting element ED-B may include a first electrode AE-B and a second electrode CE, which face each other, and a blue light emitting layer EML-B, which is disposed between the first electrode AE-B and the second electrode CE.

In the display element layer EDL, the first electrodes AE-R, AE-G, AE-B, and AE may be made of a metal material, a metal alloy, or a conductive compound. The first electrodes AE-R, AE-G, AE-B, and AE may be an anode or a cathode. However the inventive concept is not limited thereto. For example, the first electrodes AE-R, AE-G, AE-B, and AE may be a pixel electrode or a sensing electrode. The first electrodes AE-R, AE-G, AE-B, and AE may be a transmissive electrode, a transflective electrode, or a reflective electrode. When the first electrodes AE-R, AE-G, AE-B, and AE are transmissive electrodes, the first electrodes AE-R, AE-G, AE-B, and AE may include a transparent metal oxide, for example, indium tin oxide (ITO), indium zinc oxide (IZO), zinc oxide (ZnO), indium tin zinc oxide (ITZO), or the like. When the first electrodes AE-R, AE-G, AE-B, and AE are transflective electrodes or reflective electrodes, the first electrodes AE-R, AE-G, AE-B, and AE may include Ag, Mg, Cu, Al, Pt, Pd, Au, Ni, Nd, Ir, Cr, Li, Ca, LiF/Ca, LiF/Al, Mo, Ti, W, or a compound or mixture thereof (e.g., a mixture of Ag and Mg).

The second electrode CE may be a common electrode. In other words, the second electrode CE may be a common layer in the light emitting elements ED-R, ED-G, and ED-B and the light receiving element OPD. The second electrode CE may be a cathode or anode, but the inventive concept is not limited thereto. For example, when the first electrodes AE-R, AE-G, AE-B, and AE are anodes, the second electrode CE may be a cathode. When the first electrodes AE-R, AE-G, AE-B, and AE are cathodes, the second electrode CE may be an anode.

The second electrode CE may be a transmissive electrode, a transflective electrode, or a reflective electrode. When the second electrode CE is a transmissive electrode, the second electrode CE may be made of a transparent metal oxide, for example, indium tin oxide (ITO), indium zinc oxide (IZO), zinc oxide (ZnO), indium tin zinc oxide (ITZO), or the like. When the second electrode CE is a transflective electrode or a reflective electrode, the second electrode CE may include Ag, Mg, Cu, Al, Pt, Pd, Au, Ni, Nd, Ir, Cr, Li, Ca, LiF/Ca, LiF/Al, Mo, Ti, Yb, W, or a compound or mixture including the same (e.g., AgMg, AgYb, or MgAg).

The first electrodes AE-R, AE-G, AE-B, and AE included in the display element layer EDL may be transflective electrodes or reflective electrodes, and the second electrode CE may be a transmissive electrode or a transflective electrode. For example, when the transmissive or transflective second electrode CE is included in an embodiment of the inventive concept, the light reflected from an external object may be easily delivered to the light receiving element OPD.

The hole transport region HTR may be disposed above the first electrodes AE-R, AE-G, AE-B, and AE. The hole transport region HTR may be patterned and disposed in each of the light emitting elements ED-R, ED-G, and ED-B and the light receiving element OPD. The hole transport region HTR may be disposed on the light emitting layers EML-R, EML-G, and EML-B or the light receiving layer OPL, and may be provided divided by the pixel defining layer PDL. However, this is merely an example, and the inventive concept is not limited thereto.

The hole transport region HTR may be a single layer made of a single material, a single layer formed of a plurality of materials different from each other, or a multi-layered structure that has a plurality of layers made of a plurality of materials different from each other. For example, the hole transport region HTR may have a structure of a single layer such as a hole injection layer or a hole transport layer, or may have a single-layered structure made of a hole injection material and a hole transport material. The hole transport region HTR may include a hole transport layer and may further include a hole injection layer.

The electron transport region ETR may be disposed above the hole transport region HTR. The electron transport region ETR may be a common layer in the light emitting elements ED-R, ED-G, and ED-B and the light receiving element OPD. The electron transport region ETR may overlap all of the pixel defining layer PDL, the light emitting layers EML-R, EML-G, and EML-B, and the light receiving layer OPL. However, this is merely an example, and the inventive concept is not limited thereto.

The electron transport region ETR may be a single layer made of a single material, a single layer formed of a plurality of materials different from each other, or a multi-layered structure that has a plurality of layers made of a plurality of materials different from each other. For example, the electron transport region ETR may have a structure of a single layer such as an electron injection layer or an electron transport layer, or may have a single-layered structure made of an electron injection material and an electron transport material. In addition, the electron transport region ETR may have a structure of a single layer made of a plurality of materials different from each other, and may further include a plurality of layers sequentially stacked in the thickness direction. In an embodiment of the inventive concept, the electron transport region ETR included in the light emitting elements ED-R, ED-G, and ED-B and the light receiving element OPD may include an electron transport layer and may further include an electron injection layer.

The light emitting layers EML-R, EML-G, and EML-B of the light emitting elements ED-R, ED-G, and ED-B may be disposed in the first openings OP-E. In other words, the light emitting layers EML-R, EML-G, and EML-B may be separated from each other and formed within the first openings OP-E. The light emitting layers EML-R, EML-G, and EML-B may include an organic light emitting material or may include a quantum-dot material.

In each of the light emitting elements ED-R, ED-G, and ED-B, the hole transport region HTR may be disposed between the first electrodes AE-R, AE-G, and AE-B and the light emitting layers EML-R, EML-G, and EML-B, and the electron transport region ETR may be disposed between the light emitting layers EML-R, EML-G, and EML-B and the second electrode CE. In other words, the light emitting layers EML-R, EML-G, and EML-B may be disposed between the hole transport region HTR and the electron transport region ETR.

The light receiving layer OPL may be disposed between the first electrode AE and the second electrode CE, and may be disposed within the second opening OP-I. For example, the light receiving layer OPL may be sandwiched between the first electrode AE and the hole transport region HTR. The light receiving layer OPL may include a light receiving material that receives light and converts the light into an electrical signal. For example, in an embodiment of the inventive concept, the light receiving layer OPL may include an organic light receiving material. In an embodiment of the inventive concept, the light receiving layer OPL may include an organic polymer material or the like as a light receiving material, and for example, the light receiving layer OPL may include conjugated polymer. The light receiving layer OPL may include a thiophene-based conjugated polymer, a benzothiophene-based conjugated polymer, a thieno[3,4-c]pyrrole-4,6-dione (TPD)-based conjugated polymer, a diketopyrrole-pyrrole (DPP)-based conjugated polymer, a benzothiadiazole (BT)-based conjugated polymer, or the like. However, the inventive concept is not limited thereto.

In the light receiving element OPD, the light receiving layer OPL may be provided between the first electrode AE and the second electrode CE and disposed in a layer different from the light emitting layers EML-R, EML-G, and EML-B in the thickness direction. For example, as illustrated in FIGS. 5A and 6A, the light receiving layer OPL may be disposed between the hole transport region HTR and a light receiving electrode AE, and the light emitting layer EML-G may be disposed between the hole transport region HTR and the electron transport region ETR. In this case, the light receiving layer OPL may be closer to an upper surface of the base substrate BS than the light emitting layer EML-G. In other words, the light receiving layer OPL may be disposed in a layer below the light emitting layers EML-R, EML-G, and EML-B.

In addition, as illustrated in FIGS. 5B and 6B, the light receiving layer OPL may be disposed between the electron transport region ETR and the second electrode CE. In other words, the light receiving layer OPL may be disposed in a layer above the light emitting layers EML-R, EML-G, and EML-B.

The electronic devices ED and ED-1 according to an embodiment of the inventive concept have a structure in which the light receiving layer OPL is disposed in a layer different from the light emitting layers EML-R, EML-G, and EML-B, and thus, the area of the light receiving layer OPL may be formed to be larger than the area of the light emitting layers EML-R, EML-G, and EML-B in a plan view. For example, the area of the pixel defining layer PDL disposed between the light emitting regions PXA-R, PXA-G, and PXA-B and the light receiving region IPA is made to decrease in the plan view, and thus, the area of the light receiving region IPA may increase in a plan view. For example, in reference to FIG. 5A, the pixel defining layer PDL between the light emitting region PXA-G and the light receiving region IPA may have a smaller width than the pixel defining layer PDL between the light emitting regions PXA-R and PXA-G. When the light emitting layers EML-R, EML-G, and EML-B and the light receiving layer OPL are formed in the same layer, there is a limitation in reducing the area of the pixel defining layer PDL in the plan view due to mixing of a light emitting material and a light receiving material. However, in the electronic devices ED and ED-1 according to an embodiment of the inventive concept, the light emitting layers EML-R, EML-G, and EML-B and the light receiving layer OPL are formed in different layers, and thus, the area of the pixel defining layer PDL may be made to decrease in the plan view without mixing of the light emitting material and the light receiving material, and accordingly, the area of the light receiving layer OPL may be made to increase in the plan view.

In the plan view, the light receiving layer OPL may not overlap with the light emitting layers EML-R, EML-G, and EML-B. In other words, the light receiving layer OPL and the light emitting layers EML-R, EML-G, and EML-B may be disposed in layers different from each other in the thickness direction, and may not overlap with each other in the plan view.

In addition, the area of the second opening OP-I may be greater than the area of the first opening OP-E in the plan view. This is so, because the pixel defining layers PDL in which the second opening OP-I are formed may have a smaller width compared to the pixel defining layers PDL in which at least one of the first openings OP-E is formed. The area of the light receiving layer OPL disposed inside the second opening OP-I in the plan view may be greater than the area of the light emitting layers EML-R, EML-G, and EML-B disposed inside the first opening OP-E in the plan view. In the plan view, the area of the light receiving region IPA may be greater than the area of the light emitting regions PXA-R, PXA-G, and PXA-B.

Referring to FIGS. 6A and 6B, in the electronic devices ED and ED-1 according to an embodiment of the inventive concept, light OT-L discharged from a light emitting element ED-G included in the display element layer EDL may be reflected from an external object (e.g., the fingerprint FG), and reflected light IP-L may be incident onto the light receiving element OPD included in the display element layer EDL. The light receiving element OPD receives the incident light and recognizes an external input by converting the light into an electrical signal, and thus, a driving state of the electronic devices ED and ED-1 may be changed.

In the electronic devices ED and ED-1, an amount of the reflected light IP-L incident to the light receiving element OPD may increase as the area of the light receiving element OPD increases in the plan view. The electrical signal generated by the light receiving element OPD may be stronger as the amount of the reflected light IP-L incident to the light receiving element OPD increases. In other words, the electronic devices ED and ED-1 may have enhanced sensing sensitivity to an external object because the area of the light receiving element OPD is relatively large in the plan view.

For example, since the electronic devices ED and ED-1 have the enhanced sensing sensitivity, accuracy in sensing a pattern of the user's fingerprint FG may be enhanced. Thus, the electronic devices ED and ED-1 may sense the fingerprint FG by comparing whether or not a pattern of the user's fingerprint FG stored previously is identical to a pattern of the user's fingerprint FG input in the light receiving element OPD.

The encapsulation layer TFL may be disposed on the display element layer EDL. The encapsulation layer TFL may include at least one inorganic layer and at least one organic layer. For example, the encapsulation layer TFL may include an inorganic layer, an organic layer, and an inorganic layer which are stacked in this order, but layers constituting the encapsulation layer TFL are not limited thereto.

The input sensing layer ISL may be disposed on the display element layer EDL. The input sensing layer ISL may sense an external input applied from the outside. The external input may be an input of a user. The input of the user may include various types of external inputs such as a portion of the user's body, light, heat, a pen, or pressure.

The input sensing layer ISL may be formed on the display panel DP through a continuous process. In this case, the input sensing layer ISL may be considered to be disposed directly on the display panel DP. Being disposed directly may represent that an intervening third component is not disposed between the input sensing layer ISL and the display panel DP. In other words, a separate adhesive member may not be disposed between the input sensing layer ISL and the display panel DP. For example, the input sensing layer ISL may be disposed directly on the encapsulation layer TFL.

However, the inventive concept is not limited thereto, and an adhesive member may be further disposed between the input sensing layer ISL and the display panel DP. The input sensing layer ISL may include a lower insulating layer IS-IL1, a first conductive layer IS-CL1, an interlayer insulating layer IS-IL2, a second conductive layer IS-CL2, and an upper insulating layer IS-IL3. In an embodiment of the inventive concept, at least one of the lower insulating layer IS-IL1 or the upper insulating layer IS-IL3 may be omitted.

Each of the first conductive layer IS-CL1 and the second conductive layer IS-CL2 may have a single-layered structure, or may have a multi-layered structure stacked along the third direction DR3. The conductive layer having the multi-layered structure may include at least two or more layers of transparent conductive layers or metal layers. The conductive layer having the multi-layered structure may include metal layers having different metals. The transparent conductive layers may include indium tin oxide (ITO), indium zinc oxide (IZO), zinc oxide (ZnO), indium tin zinc oxide (ITZO), PEDOT, a metal nano wire, and graphene. The metal layer may include molybdenum, silver, titanium, copper, aluminum, and an alloy thereof. For example, each of the first conductive layer IS-CL1 and the second conductive layer IS-CL2 may have a three-layered metal structure, such as, a three-layered structure of titanium/aluminum/titanium. The metal having relatively high durability and low reflectivity may be applied to the upper/lower layers, and the metal having high electrical conductivity may be applied to the inner layer.

Each of the first conductive layer IS-CL1 and the second conductive layer IS-CL2 includes a plurality of conductive patterns. Hereinafter, the first conductive layer IS-CL1 is described as including first conductive patterns, and the second conductive layer IS-CL2 is described as including second conductive patterns. Each of the first conductive patterns and the second conductive patterns may include sensing electrodes and signal lines connected to the sensing electrodes. The first conductive patterns and the second conductive patterns may overlap a light blocking part BM which will be described later. The light blocking part BM overlaps the first conductive layer IS-CL1 and the second conductive layer IS-CL2 and prevents reflection of external light caused by the first conductive layer IS-CL1 and the second conductive layer IS-CL2.

Each of the lower insulating layer IS-IL1, the interlayer insulating layer IS-IL2, and the upper insulating layer IS-IL3 may include an inorganic film or an organic film. In the present embodiment, each of the lower insulating layer IS-IL1 and the interlayer insulating layer IS-IL2 may be an inorganic film. In addition, the upper insulating layer IS-IL3 may include an organic film.

In an embodiment of the inventive concept, the anti-reflection member RP may be disposed on the display panel DP. In an embodiment of the inventive concept, the anti-reflection member RP may be disposed directly on the input sensing layer ISL. The anti-reflection member RP may include a color filter layer CFL and an organic planarization layer OCL.

The color filter layer CFL may include filter parts CF and a light blocking part BM. The filter parts CF may include a red filter part CF-R, a green filter part CF-G, and a blue filter part CF-B. The red filter part CF-R, the green filter part CF-G, and the blue filter part CF-B may be parts which are positioned corresponding to the red light emitting region PXA-R, the green light emitting region PXA-G, and the blue light emitting region PXA-B, respectively. In addition, the green filter part CF-G may overlap with the light receiving region IPA. In other words, in an embodiment of the inventive concept, the green filter part CF-G may overlap with the green light emitting element ED-G and the light receiving element OPD.

The red filter part CF-R may allow red light to be transmitted therethrough, the green filter part CF-G may allow green light to be transmitted therethrough, and the blue filter part CF-B may allow blue light to be transmitted therethrough. Each of the red filter part CF-R, the green filter part CF-G, and the blue filter part CF-B may include a polymer photosensitive resin and a pigment or dye. The red filter part CF-R may include a red pigment or dye, the green filter part CF-G may include a green pigment or dye, and the blue filter part CF-B may include a blue pigment or dye.

However, the inventive concept is not limited thereto, and the blue filter part CF-B may not include a pigment or dye. The blue filter part CF-B may include a polymer photosensitive resin but may not include a pigment or dye. The blue filter part CF-B may be transparent. The blue filter part CF-B may be formed of a transparent photosensitive resin.

The light blocking part BM may be disposed on the input sensing layer ISL and overlap with the boundary between neighboring filter parts CF. The edges of the neighboring filter parts CF may overlap with each other. For example, the green filter part CF-G and the red filter part CF-R may be disposed on the light blocking part BM while overlapping with each other, or the green filter part CF-G and the blue filter part CF-B may be disposed on the light blocking part BM while overlapping with each other. The light blocking part BM may prevent a light leakage phenomenon and may form a boundary between neighboring color filter parts CF-R, CF-G, and CF-B.

The light blocking part BM may be a black matrix. The light blocking part BM may include an organic pigment or dye. The light blocking part BM may include an organic light blocking material or an inorganic light blocking material which includes a black pigment or a black dye. The light blocking part BM may be formed of a light blocking composition that includes propylene glycol monomethyl ether acetate, 3-methoxybutyl acetate, and an organic black pigment.

In addition, the light blocking part BM may overlap with the pixel defining layer PDL. The light blocking parts BM may overlap with the pixel defining layers PDL that divide regions between the light emitting regions PXA-R, PXA-G, and PXA-B and regions between the light emitting regions PXA-R, PXA-G, and PXA-B and the light receiving region IPA.

The organic planarization layer OCL may be disposed on the color filter layer CFL. The organic planarization layer OCL may be disposed on the color filter layer CFL to protect the color filter parts CF-R, CF-G, and CF-B, and make the top surface of the color filter layer CFL flat. The organic planarization layer OCL may include an organic material such as an acrylic resin or an epoxy resin. The organic planarization layer OCL may be formed by photo-curing or heat-curing the organic material such as the acrylic resin or the epoxy resin. The organic planarization layer OCL may be made of a single layer or a plurality of layers.

Figure 7A:
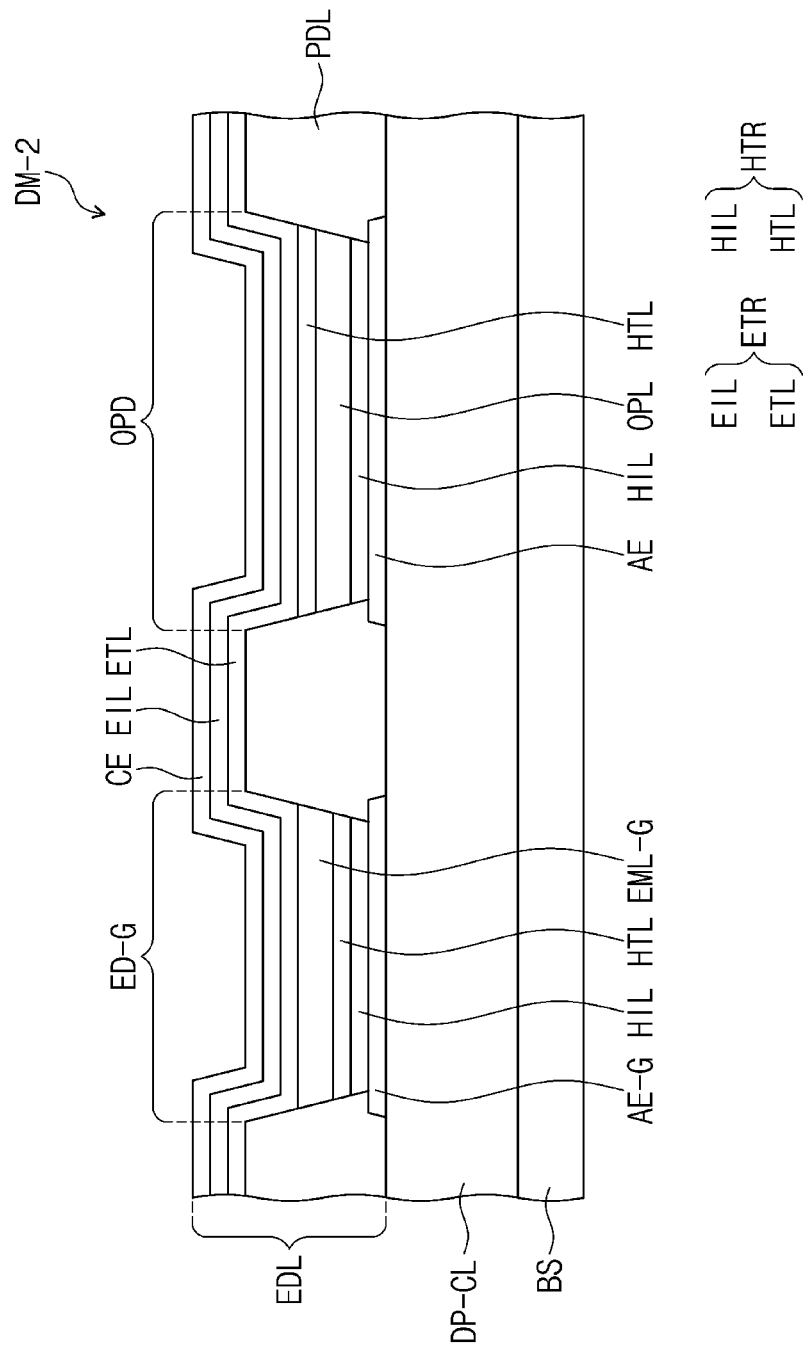
FIG. 7A is a cross-sectional view showing a portion of a display module according to an embodiment of the inventive concept.
Figure 7B:
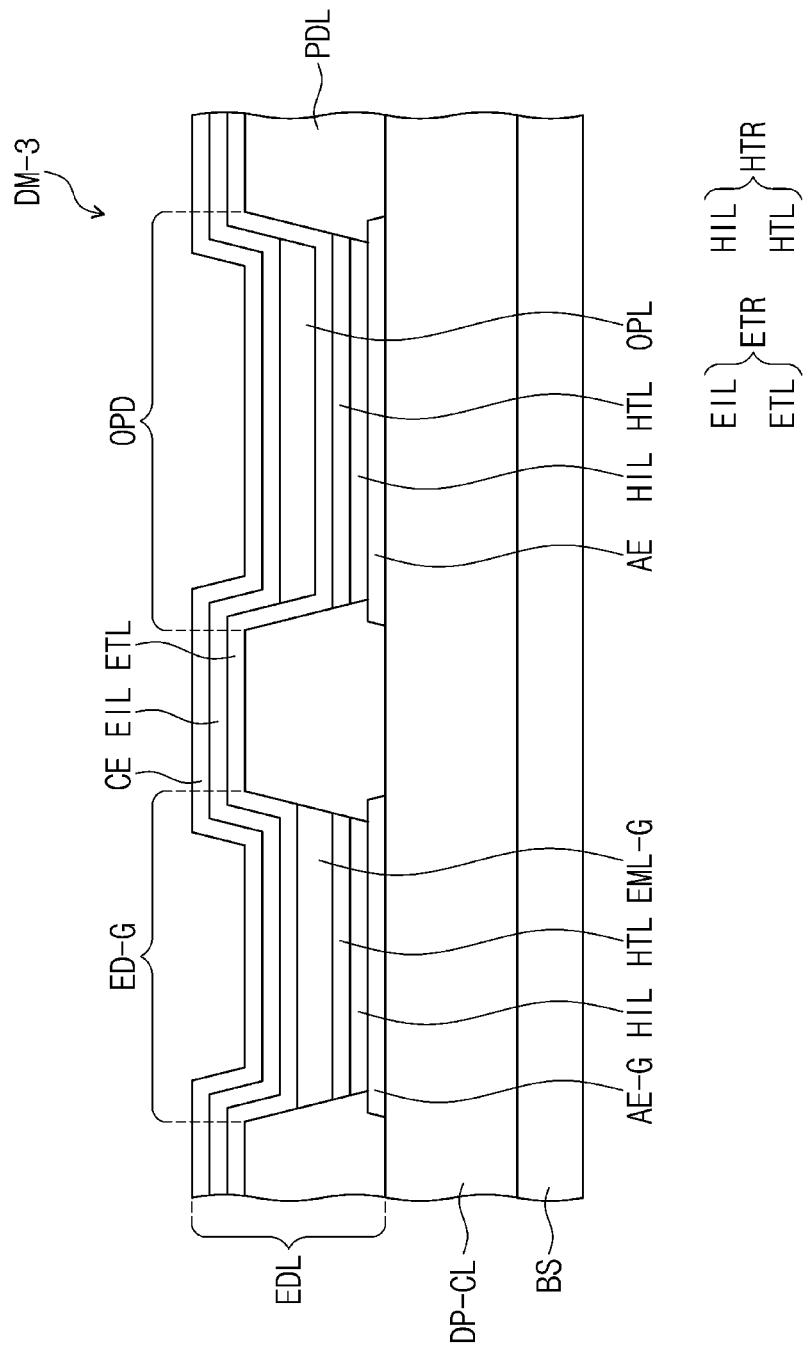
FIG. 7B is a cross-sectional view showing a portion of a display module according to an embodiment of the inventive concept.

Each of FIGS. 7A and 7B is a cross-sectional view showing a portion of a display module according to an embodiment of the inventive concept. When describing an embodiment with reference to FIGS. 7A and 7B, contents duplicated with those described with reference to FIGS. 1 to 6B may not be described again, but their differences will be mainly described.

Display modules DM-2 and DM-3 according to the embodiment illustrated in FIGS. 7A and 7B are partially different from the display modules DM and DM-1 (FIGS. 6A and 6B) according to the embodiment illustrated in FIGS. 6A and 6B in terms of a configuration of a display element layer EDL.

Referring to FIGS. 7A and 7B, in each of the display modules DM-2 and DM-3, a hole transport region HTR may include a hole injection layer HIL disposed above each of first electrodes AE-G and AE and a hole transport layer HTL disposed between the hole injection layer HIL and a second electrode CE. The hole injection layer HIL and the hole transport layer HTL may be patterned and provided in each of a light emitting element ED-G and a light receiving element OPD. The hole injection layer HIL may be in direct contact with each of the first electrodes AE-G and AE.

A light emitting layer EML-G may be disposed between the hole transport layer HTL and an electron transport region ETR. A light receiving layer OPL may be provided between the first electrode AE also referred to as a light receiving electrode AE and the second electrode CE and disposed in a layer different from the light emitting layer EML-G. For example, as illustrated in FIG. 7A, the light receiving layer OPL may be disposed between the hole injection layer HIL and the hole transport layer HTL. In addition, the light receiving layer OPL may be disposed below the light emitting layer EML-G. In addition, as described above, the light receiving layer OPL may be disposed between the light receiving electrode AE and the hole transport region HTR.

In each of the display modules DM-2 and DM-3, the electron transport region ETR may include an electron transport layer ETL disposed on the hole transport region HTR and an electron injection layer EIL disposed between the electron transport layer ETL and the second electrode CE. For example, the electron transport layer ETL and the hole transport region HTR may be in direct contact with each other in the light receiving element OPD, but not in the light emitting element ED-G. The electron transport layer ETL and the electron injection layer EIL may be disposed as common layers in the light emitting element ED-G and the light receiving element OPD.

The light emitting layer EML-G may be disposed between the electron transport layer ETL and the hole transport region HTR. The light receiving layer OPL may be provided between the light receiving electrode AE and the second electrode CE and disposed in a layer different from the light emitting layer EML-G. For example, as illustrated in FIG. 7B, the light receiving layer OPL may be disposed between the electron injection layer EIL and the electron transport layer ETL. In the case shown in FIG. 7B, the light receiving layer OPL may be higher than the light emitting layer EML-G. In addition, as described above, the light receiving layer OPL may be disposed between the electron transport region ETR and the second electrode CE.

In each of the display modules DM-2 and DM-3, the hole transport region HTR may include the hole injection layer HIL disposed above each of the first electrodes AE-G and AE and the hole transport layer HTL disposed between the hole injection layer HIL and the second electrode CE. In addition, the electron transport region ETR may include the electron transport layer ETL disposed on the hole transport region HTR and the electron injection layer EIL disposed between the electron transport layer ETL and the second electrode CE.

The light emitting layer EML-G may be disposed between the hole transport layer HTL and the electron transport layer ETL. The light receiving layer OPL may be provided between the light receiving electrode AE and the second electrode CE and disposed in a layer different from the light emitting layer EML-G. For example, the light receiving layer OPL may be disposed between the hole injection layer HIL and the hole transport layer HTL as illustrated in FIG. 7A, or may be disposed between the electron injection layer EIL and the electron transport layer ETL as illustrated in FIG. 7B. The light receiving layer OPL may also be disposed between the light receiving electrode AE and the hole injection layer HIL, or may be disposed between the electron injection layer EIL and the second electrode CE.

The display modules DM-2 and DM-3 have a structure in which the light emitting layer EML-G is disposed in a layer different from the light receiving layer OPL, and thus, the area of a pixel defining layer PDL may be made to decrease in a plan view without mixing of a light emitting material and a light receiving material, and accordingly, the area of the light receiving layer OPL may be made to increase in the plan view. On the contrary, when the light emitting layer EML-G and the light receiving layer OPL are formed in the same layer, there is a limitation in reducing the area of the pixel defining layer PDL in the plan view due to the mixing of the light emitting material and the light receiving material.

In addition, the display modules DM-2 and DM-3 may have enhanced sensing sensitivity to an external input because the area of the light receiving layer OPL is greater than the area of the light emitting layer EML-G in the plan view.

Figure 8A:
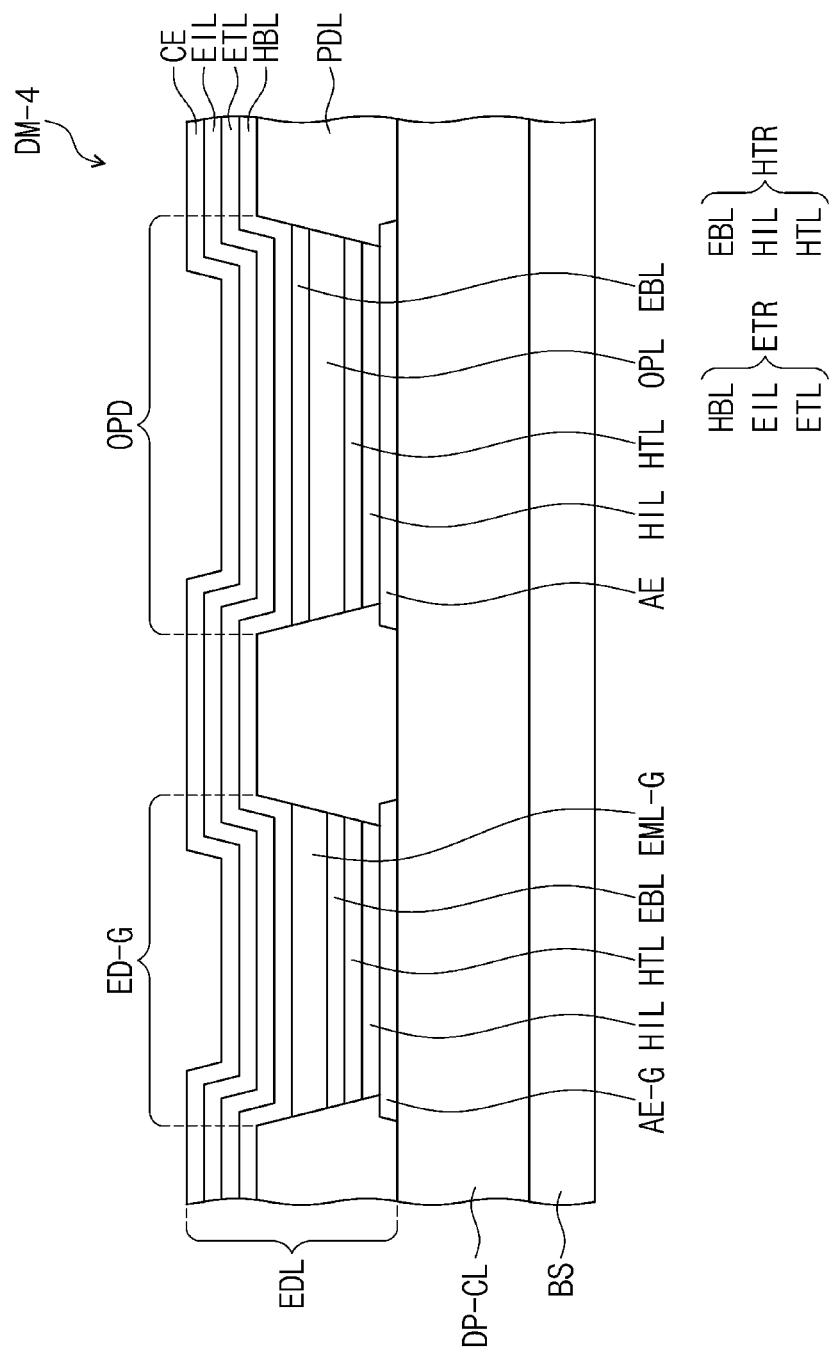
FIG. 8A is a cross-sectional view showing a portion of a display module according to an embodiment of the inventive concept.
Figure 8B:
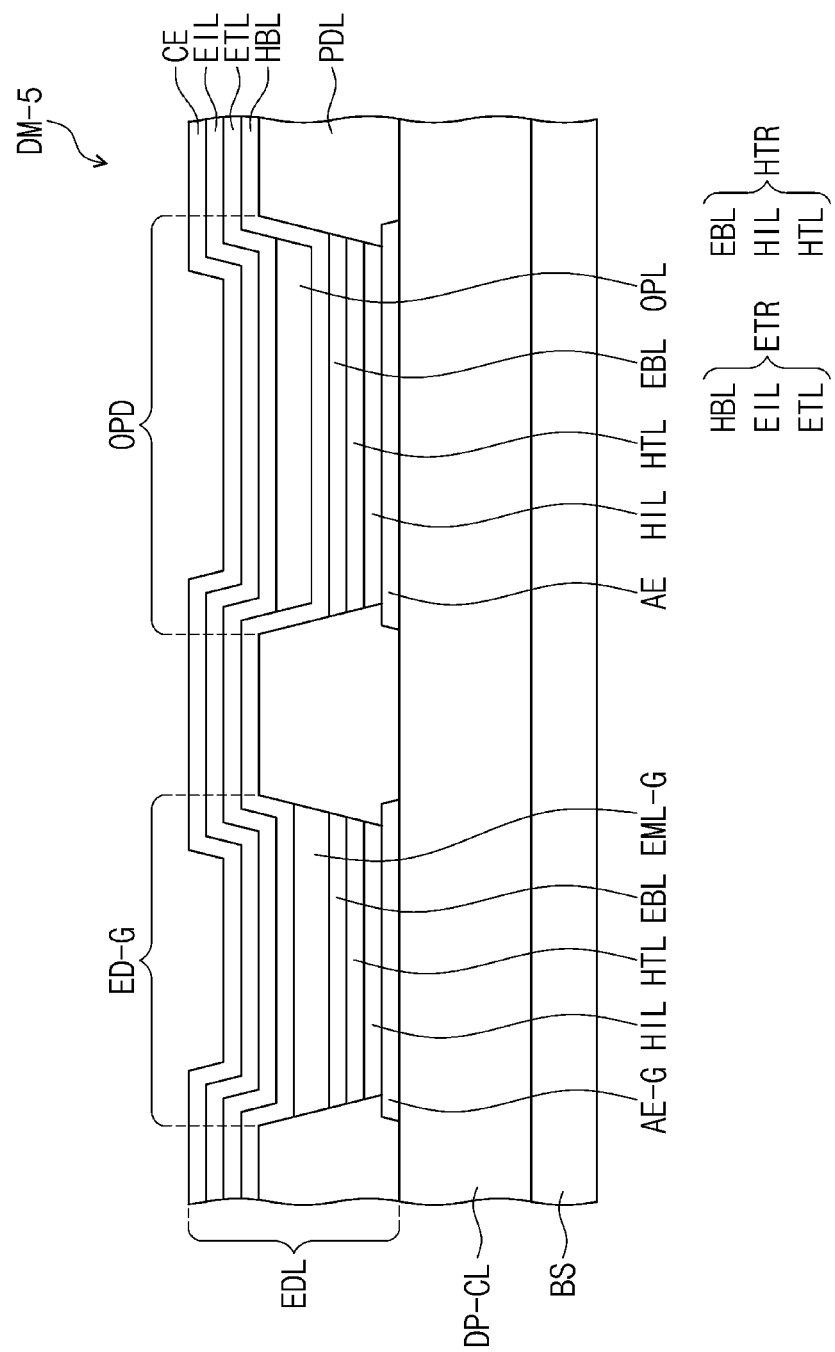
FIG. 8B is a cross-sectional view showing a portion of a display module according to an embodiment of the inventive concept.

Each of FIGS. 8A and 8B is a cross-sectional view showing a portion of a display module according to an embodiment of the inventive concept. When describing an embodiment with reference to FIGS. 8A and 8B, contents duplicated with those described with reference to FIGS. 1 to 6B may not be described again, but their differences will be mainly described.

Display modules DM-4 and DM-5 according to the embodiment illustrated in FIGS. 8A and 8B are partially different from the display modules DM and DM-1 (FIGS. 6A and 6B) according to the embodiment illustrated in FIGS. 6A and 6B in terms of a configuration of a display element layer EDL.

Referring to FIGS. 8A and 8B, in each of the display modules DM-4 and DM-5, a hole transport region HTR may include a hole injection layer HIL disposed above each of first electrodes AE-G and AE, a hole transport layer HTL disposed between the hole injection layer HIL and a second electrode CE, and an electron blocking layer EBL disposed between the hole transport layer HTL and the second electrode CE. The hole injection layer HIL, the hole transport layer HTL, and the electron blocking layer EBL may be patterned and provided in each of a light emitting element ED-G and a light receiving element OPD.

A light emitting layer EML-G may be disposed between the electron blocking layer EBL and an electron transport region ETR. A light receiving layer OPL may be provided between a light receiving electrode AE and the second electrode CE and disposed in a layer different from the light emitting layer EML-G. For example, as illustrated in FIG. 8A, the light receiving layer OPL may be disposed between the hole transport layer HTL and the electron blocking layer EBL. In this case, the light receiving layer OPL may be at a level lower than that of the light emitting layer EML-G. In addition, as described above, the light receiving layer OPL may be disposed between the hole transport region HTR and the light receiving electrode AE, or may be disposed between the hole transport layer HTL and the hole injection layer HIL.

In each of the display modules DM-4 and DM-5, an electron transport region ETR may include a hole blocking layer HBL disposed on the hole transport region HTR, an electron transport layer ETL disposed between the hole blocking layer HBL and the second electrode CE, and an electron injection layer EIL disposed between the electron transport layer ETL and the second electrode CE. The hole blocking layer HBL, the electron transport layer ETL, and the electron injection layer EIL may be disposed as common layers in the light emitting element ED-G and the light receiving element OPD.

The light emitting layer EML-G may be disposed between the hole blocking layer HBL and the hole transport region HTR. A light receiving layer OPL may be provided between a light receiving electrode AE and the second electrode CE and disposed in a layer different from the light emitting layer EML-G. For example, as illustrated in FIG. 8B, the light receiving layer OPL may be disposed between the hole blocking layer HBL and the electron transport layer ETL. In this case, the light receiving layer OPL may be at a level higher than that of the light emitting layer EML-G. In addition, as described above, the light receiving layer OPL may be disposed between the electron transport region ETR and the second electrode CE, or may be disposed between the electron transport layer ETL and the electron injection layer EIL.

In each of the display modules DM-4 and DM-5, the hole transport region HTR may include the hole injection layer HIL disposed above each of the first electrodes AE-G and AE, the hole transport layer HTL disposed between the hole injection layer HIL and the second electrode CE, and the electron blocking layer EBL disposed between the hole transport layer HTL and the second electrode CE. In addition, the electron transport region ETR may include the hole blocking layer HBL disposed on the hole transport region HTR, the electron transport layer ETL disposed between the hole blocking layer HBL and the second electrode CE, and the electron injection layer EIL disposed between the electron transport layer ETL and the second electrode CE.

The light emitting layer EML-G may be disposed between the hole transport layer HTL and the electron transport layer ETL. A light receiving layer OPL may be provided between a light receiving electrode AE and the second electrode CE and disposed in a layer different from the light emitting layer EML-G. For example, the light receiving layer OPL may be disposed between the electron blocking layer EBL and the hole transport layer HTL as illustrated in FIG. 8A, or may be disposed between the hole blocking layer HBL and the electron transport layer ETL as illustrated in FIG. 8B. The light receiving layer OPL may also be disposed between the light receiving electrode AE and the hole injection layer HIL, or may be disposed between the electron injection layer EIL and the second electrode CE.

The display modules DM-4 and DM-5 have a structure in which the light emitting layer EML-G is disposed in a layer different from the light receiving layer OPL, and thus, the area of a pixel defining layer PDL may be made to decrease in a plan view without mixing of a light emitting material and a light receiving material, and accordingly, the area of the light receiving layer OPL may be made to increase in the plan view. On the contrary, when the light emitting layer EML-G and the light receiving layer OPL are formed in the same layer, there is a limitation in reducing the area of the pixel defining layer PDL in the plan view due to the mixing of the light emitting material and the light receiving material.

In addition, the display modules DM-4 and DM-5 may have enhanced sensing sensitivity to an external input because the area of the light receiving layer OPL is greater than the area of the light emitting layer EML-G in the plan view.

Figure 9A:
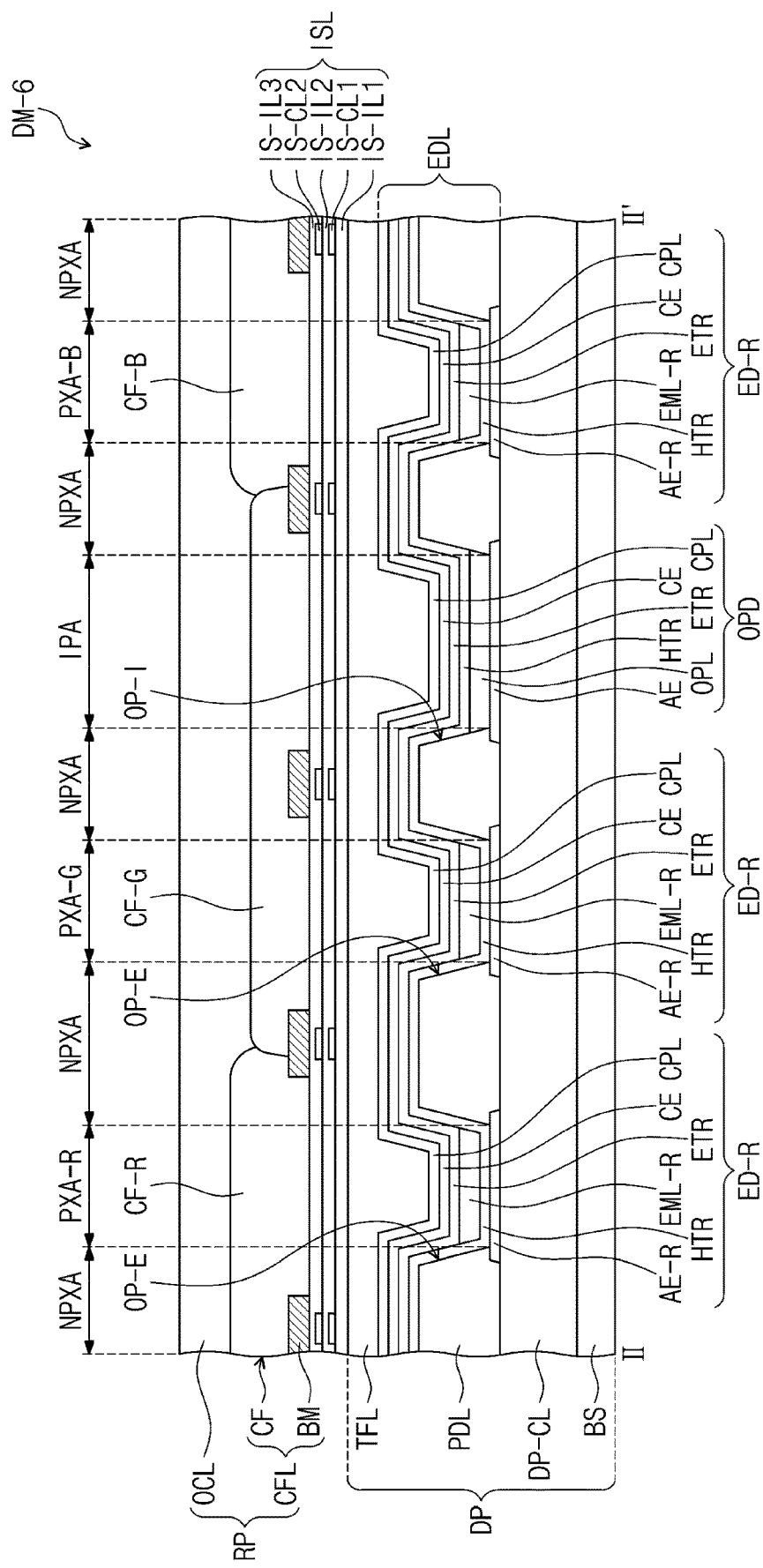
FIG. 9A is a cross-sectional view showing a portion of a display module according to an embodiment of the inventive concept.
Figure 9B:
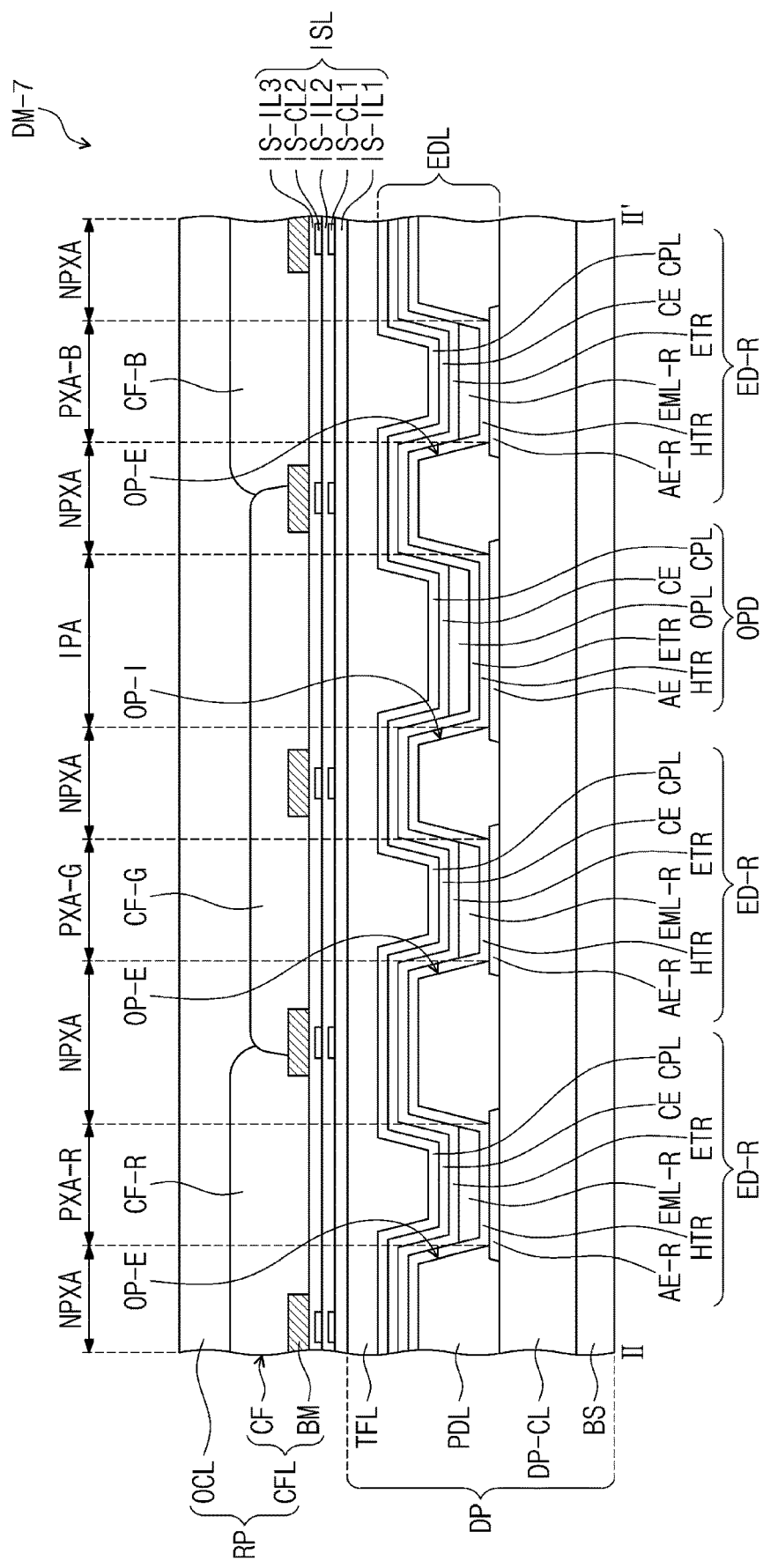
FIG. 9B is a cross-sectional view showing a portion of a display module according to an embodiment of the inventive concept.

Each of FIGS. 9A and 9B is a cross-sectional view showing a portion of a display module according to an embodiment of the inventive concept. When describing an embodiment with reference to FIGS. 9A and 9B, contents duplicated with those described with reference to FIGS. 1 to 8B may not be described again, but their differences will be mainly described.

Display modules DM-6 and DM-7 according to an embodiment illustrated in FIGS. 9A and 9B are partially different from the display modules DM and DM-1 (FIGS. 5A and 5B) according to the embodiment illustrated in FIGS. 5A and 5B in terms of a configuration of a display element layer EDL.

Referring to FIGS. 9A and 9B, in each of the display modules DM-6 and DM-7, a hole transport region HTR may be provided as a common layer. The hole transport region HTR may overlap all of a light receiving electrode AE, light emitting electrodes AE-R, AE-G, and AE-B, and a pixel defining layer PDL. The hole transport region HTR may overlap all of first to third light emitting layers EML-R, EML-G, and EML-B, a light receiving layer OPL, and a pixel defining layer PDL.

In each of the display modules DM-6 and DM-7, an electron transport region ETR may be provided as a common layer. The electron transport region ETR may overlap all of the light receiving electrode AE, the light emitting electrodes AE-R, AE-G, and AE-B, and the pixel defining layer PDL. The electron transport region ETR may overlap all of the first to third light emitting layers EML-R, EML-G, and EML-B, the light receiving layer OPL, and the pixel defining layer PDL.

In addition, a display element layer EDL may further include a capping layer CPL. The capping layer CPL may be disposed on a second electrode CE of light emitting elements ED-R, ED-G, and ED-B and a light receiving element OPD. The capping layer CPL may be disposed between the second electrode CE and an encapsulation layer TFL. The capping layer CPL may be provided as a common layer that overlaps all of a pixel defining layer PDL, light emitting layers EML-R, EML-G, and EML-B, and a light receiving layer OPL.

The capping layer CPL may include a multilayer or a single layer. In an embodiment of the inventive concept, the capping layer CPL may be an organic layer or an inorganic layer. For example, when the capping layer CPL includes an inorganic material, this inorganic material may include an alkali metal compound such as LiF, an alkali earth-metal compound such as $MgF_2$, or SiON, $SiN_x$, $SiO_y$, or the like.

For example, when the capping layer CPL includes an organic material, this organic material may include α-NPD, NPB, TPD, m-MTDATA, $Alq_3$, CuPc, TPD15(N4,N4,N4', N4'-tetra(biphenyl-4-yl)biphenyl-4,4'-diamine), TCTA(4,4', 4"-Tris(carbazol-9-yl)triphenylamine), or the like, or may include an epoxy resin or acrylate such as methacrylate. However, the inventive concept is not limited thereto.

The electronic device according to an embodiment of the inventive concept may include both the light emitting element and the light receiving element in the display element layer. Each of the light emitting element and the light receiving element includes the first electrode, the hole transport region, the electron transport region, and the second electrode which are stacked in this order. The light emitting element includes the light emitting layer which is disposed between the hole transport region and the electron transport region, and the light receiving element includes the light receiving layer which is provided between the first electrode and the second electrode and is disposed in a layer different from the light emitting layer in the thickness direction. In the electronic device according to this embodiment, the light emitting layer and the light receiving layer are disposed in different layers, and thus, the light receiving layer having the large area in the plan view may be formed without mixing of the light emitting material and the light receiving material.

In the electronic device according to an embodiment of the inventive concept, the light emitting element and the light receiving element are disposed in different layers, and thus, the area of the display element layer on which the light receiving element is disposed may increase.

Although the inventive concept has been described with reference to embodiments thereof, it will be understood that various changes and modifications of the inventive concept may be made by one ordinary skilled in the art or one having ordinary knowledge in the art without departing from the spirit and scope of the inventive concept as hereinafter claimed.

What is claimed is:

1. An electronic device, comprising:
   a base layer;
   a display element layer disposed on the base layer and comprising a pixel defining layer that includes an opening, and a light emitting element and a light receiving element, which are separated by the pixel defining layer; and
   an input sensing layer disposed on the display element layer,
   wherein each of the light emitting element and the light receiving element comprises:
   a first electrode;
   a hole transport region disposed on the first electrode;
   an electron transport region disposed on the hole transport region; and
   a second electrode disposed on the electron transport region,
   wherein the second electrode is a common layer in the light emitting element and the light receiving element,
   the light emitting element comprises a light emitting layer disposed between the hole transport region and the electron transport region, and
   the light receiving element comprises a light receiving layer which is provided between the first electrode and the second electrode and disposed in a layer different from the light emitting layer in a thickness direction of the electronic device.

2. The electronic device of claim 1, wherein an area of the light receiving layer is greater than an area of the light emitting layer in a plan view.

3. The electronic device of claim 1, wherein the light receiving layer does not overlap the light emitting layer in a plan view.

4. The electronic device of claim 1, wherein the light receiving layer is disposed between the electron transport region and the second electrode.

5. The electronic device of claim 1, wherein the electron transport region comprises an electron transport layer and an electron injection layer disposed between the electron transport layer and the second electrode, and
   the light receiving layer is disposed between the electron transport layer and the electron injection layer or between the electron injection layer and the second electrode.

6. The electronic device of claim 1, wherein the electron transport region comprises a hole blocking layer, an electron transport layer disposed between the hole blocking layer and the second electrode, and an electron injection layer disposed between the electron transport layer and the second electrode, and
   the light receiving layer is disposed between the hole blocking layer and the electron transport layer, between the electron transport layer and the electron injection layer or between the electron injection layer and the second electrode.

7. The electronic device of claim 1, wherein the light receiving layer is disposed between the hole transport region and the first electrode.

8. The electronic device of claim 1, wherein the hole transport region comprises a hole transport layer and a hole injection layer disposed between the hole transport layer and the first electrode, and
   the light receiving layer is disposed between the first electrode and the hole injection layer or between the hole injection layer and the hole transport layer.

9. The electronic device of claim 1, wherein the hole transport region comprises an electron blocking layer, a hole transport layer disposed between the electron blocking layer and the first electrode, and a hole injection layer disposed between the hole transport layer and the first electrode, and the light receiving layer is disposed between the first electrode and the hole injection layer, between the hole injection layer and the hole transport layer, or between the hole transport layer and the electron blocking layer.

10. An electronic device, comprising:
a base layer;
a first electrode disposed on the base layer and comprising a light emitting electrode and a light receiving electrode which are spaced apart from each other;
a pixel defining layer which is disposed on the base layer, wherein the pixel defining layer includes a first opening to expose the light emitting electrode and a second opening to expose the light receiving electrode;
a second electrode disposed on the first electrode;
a hole transport region disposed between the first electrode and the second electrode;
an electron transport region disposed between the hole transport region and the second electrode;
a light emitting layer which overlaps the light emitting electrode and is disposed between the hole transport region and the electron transport region; and
a light receiving layer which is provided between the light receiving electrode and the second electrode and disposed in a layer different from the light emitting layer.

11. The electronic device of claim 10, wherein an area of the second opening is greater than an area of the first opening in a plan view.

12. The electronic device of claim 11, wherein an area of the light receiving layer is greater than an area of the light emitting layer in the plan view.

13. The electronic device of claim 10, wherein the light receiving layer is disposed between the light receiving electrode and the hole transport region or between the electron transport region and the second electrode.

14. The electronic device of claim 10, wherein the hole transport region comprises a hole transport layer and a hole injection layer disposed between the hole transport layer and the first electrode, and
the electron transport region comprises an electron transport layer and an electron injection layer disposed between the electron transport layer and the second electrode,
wherein the light receiving layer is disposed between the light receiving electrode and the hole injection layer, between the hole injection layer and the hole transport layer, between the electron transport layer and the electron injection layer, or between the electron injection layer and the second electrode.

15. The electronic device of claim 10, wherein the hole transport region comprises an electron blocking layer, a hole transport layer disposed between the electron blocking layer and the light receiving electrode, and a hole injection layer disposed between the hole transport layer and the light receiving electrode, and
the electron transport region comprises a hole blocking layer, an electron transport layer disposed between the hole blocking layer and the second electrode, and an electron injection layer disposed between the electron transport layer and the second electrode,
wherein the light receiving layer is disposed between the light receiving electrode and the hole injection layer, between the hole injection layer and the hole transport layer, between the hole transport layer and the electron blocking layer, between the hole blocking layer and the electron transport layer, between the electron transport layer and the electron injection layer, or between the electron injection layer and the second electrode.

16. An electronic device including a first light emitting region, a second light emitting region, a third light emitting region, and a light receiving region which are spaced apart from each other in a plan view, the electronic device comprising:
a base layer;
a display element layer comprising a pixel defining layer, which is disposed on the base layer and has an opening, and first, second and third light emitting elements and a light receiving element, which are separated by the pixel defining layer; and
an input sensing layer disposed on the display element layer,
wherein each of the first, second and third light emitting elements and the light receiving element comprises:
a first electrode;
a hole transport region disposed on the first electrode;
an electron transport region disposed on the hole transport region; and
a second electrode disposed on the electron transport region,
wherein the first, second and third light emitting elements comprise first, second and third light emitting layers, respectively, which are disposed between the hole transport region and the electron transport region, and
the light receiving element comprises a light receiving layer which is provided between the first electrode and the second electrode and disposed in a layer different from the first, second and third light emitting layers.

17. The electronic device of claim 16, wherein an area of the light receiving region is greater than an area of each of the first, second and third light emitting regions in a plan view.

18. The electronic device of claim 16, wherein the first, second and third light emitting layers are disposed in the same layer.

19. The electronic device of claim 16, wherein the first light emitting layer emits red light, the second light emitting layer emits green light, and the third light emitting layer emits blue light.

20. The electronic device of claim 16, wherein each of the hole transport region and the electron transport region overlaps the pixel defining layer, the first, second and third light emitting layers, and the light receiving layer.

* * * * *